(12) United States Patent
Baba et al.

(10) Patent No.: US 10,915,802 B2
(45) Date of Patent: Feb. 9, 2021

(54) SYSTEM FOR PRODUCING INFORMATION CODE AND METHOD OF PROCESSING INFORMATION

(71) Applicant: DENSO WAVE INCORPORATED, Chita-gun (JP)

(72) Inventors: Chiaki Baba, Chita-gun (JP); Atsushi Tano, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/253,733

(22) Filed: Jan. 22, 2019

(65) Prior Publication Data
US 2019/0228277 A1 Jul. 25, 2019

(30) Foreign Application Priority Data

Jan. 22, 2018 (JP) ................................ 2018-008391
Jan. 22, 2018 (JP) ................................ 2018-008392

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 19/06046* (2013.01)

(58) Field of Classification Search
CPC ....... G06K 19/06037; G06K 19/06046; G06K 7/1417
USPC ....................................................... 235/494
See application file for complete search history.

(56) References Cited

U.S. PATENT DOCUMENTS

| | | | |
|---|---|---|---|
| 2007/0057987 A1 | 3/2007 | Miyamoto et al. | |
| 2014/0067675 A1* | 3/2014 | Leyva | G06Q 20/40 705/44 |
| 2016/0112412 A1* | 4/2016 | Roth | H04L 63/0838 726/6 |
| 2016/0162767 A1* | 6/2016 | Ito | G06K 19/06037 235/494 |

FOREIGN PATENT DOCUMENTS

| | | |
|---|---|---|
| EP | 2 889 810 A1 | 7/2015 |
| EP | 2 937 820 A1 | 10/2015 |

OTHER PUBLICATIONS

"Generate & Track QR Codes". pp. 1-12, 2019, https://web.archive.org/web/20171001123854/https://qrd.by/.

* cited by examiner

*Primary Examiner* — Paultep Savusdiphol
(74) *Attorney, Agent, or Firm* — Oliff PLC

(57) ABSTRACT

A request including data to be recorded in an information code is transmitted to a server from a terminal. Code generation information for generating an information code, in which the data is to be recorded, is received from the server. The information code is generated based on the received code generation information by the terminal. Practically, in response to the request, the server obtains an array pattern of the light-color and dark-color cells in the code region necessary for generating the information code in which the data is recorded. Information on the array pattern is set as code generation information and transmitted to the terminal. By another example, in the server, code print information including an array pattern of the light-color and dark-color cells in the code region can be obtained, and transmitted to the server for printing by the terminal.

18 Claims, 18 Drawing Sheets

FIG.7
(A)
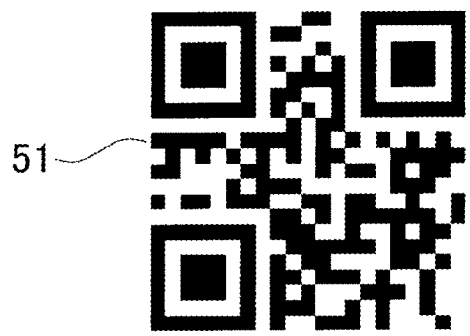
(B)
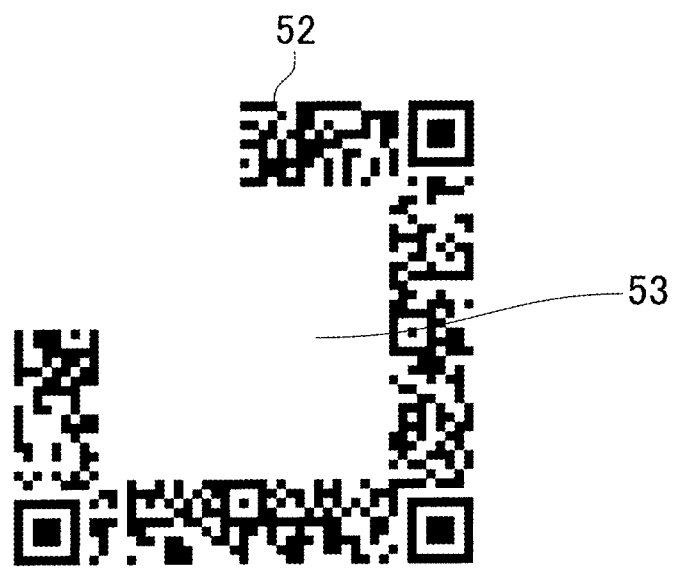

FIG.16
(A)
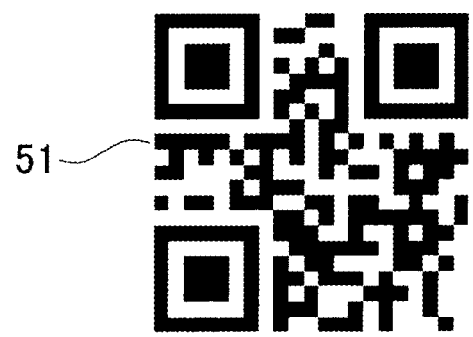
51
(B)
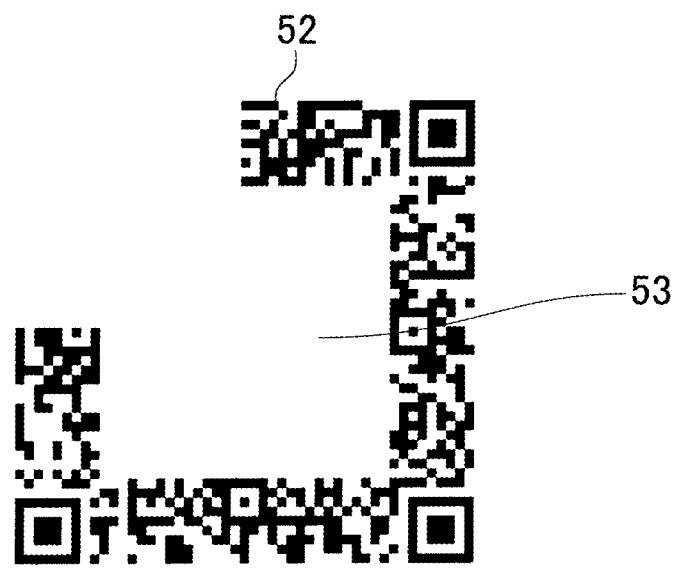
52
53

SYSTEM FOR PRODUCING INFORMATION CODE AND METHOD OF PROCESSING INFORMATION

CROSS-REFERENCE TO RELATED APPLICATIONS

This application is based on and claims the benefit of priorities from earlier Japanese Patent Applications No. 2018-008391 filed Jan. 22, 2018 and No. 2018-008392 filed Jan. 22, 2018, the descriptions of which are incorporated herein by reference.

BACKGROUND

Technical Field

The present invention relates to an information code generation system for generating an information code or printing an information code in a network in which a terminal and a server are connected so as to be able to communicate with each other, and an information processing method executed by the system.

Background Art

At present, the use of information codes is diversified, and information codes corresponding to the use are generated by various methods. For example, the information code disclosed in Patent Literature 1 is generated such that the data of the display target image is arranged in the image display region provided in the code figure after the decryption target data and the data of the display target image are acquired by the generating apparatus. Specifically, when information specifying the arrangement content of the image display region is input after the code figure in which the image display region is provided is displayed on the display unit of the generating apparatus, the information code is generated so that the image display region is newly arranged in accordance with the arrangement content specified by the input. In addition to that, the specific pattern region and the decoding target region are provided at positions other than the image display region.

CITATION LIST

Patent Literature

[PTL 1] JP 2016-076210A

When an information code is generated using a designated encoding technique, it is sometimes undesirable to disclose the encoding technique. In such a case, it is assumed that the information code is generated by a specific server. This is because, by generating an information code by using a designated encoding technique for only a specific server and acquiring the information code generated from the server by each terminal, it is not necessary to install or the like, a program using the encoding technique in each terminal, and the encoding technique can be concealed. In addition, if an information code generation program using a designated encoding technique is installed or the like in each terminal, a problem arises in that an update operation or the like is required for each terminal when updating the program or the like.

Incidentally, as the frequency of use of the information code generated using a designated encoding technique increases, the number of terminals using the information code generated by the server increases, and accordingly, the number of information codes requested from each terminal to the server increases. Such an increase in the number of information codes to be generated causes not only an increase in the load for the information code generation process in the server, but also an increase in the load for the transmission process of the generated information code. As a result of the increase in the load of the server, if the load exceeds the expected allowable amount, the information code may not be generated smoothly in the server, and therefore, there is a possibility that the information code is not transmitted appropriately from the server to the terminal that has requested the generation of the information code.

Further, a plurality of information codes in which different information is recorded for each product or the like, such as an information code or the like in which a product number is recorded, are generated by a server, and the generated information codes are transmitted to a control apparatus that controls the printing apparatus, whereby a printing apparatus controlled by the control apparatus may print a corresponding information code on the product or the like. At this time, when a large number of information codes are generated in the server, not only the load for the generation process of the information codes in the server increases, but also the load for the transmission process of the generated information codes may increase. As a result of the increase in the load of the server, if the load exceeds the expected allowable amount, there arises a problem that the information code is not generated smoothly in the server, and the information code is not transmitted smoothly from the server to the control apparatus.

SUMMARY

For this reason, it is thus desired to reduce the calculation and communication processing load of a server in a network system in which a terminal and a server are connected to be able to communicate with each other via a communication line, and in particular, to provide a configuration that can reduce the load of a server which is required to generate an information code from each terminal and the load of a server which generates information for printing an information code.

In order to achieve the above-mentioned object, according to a first aspect of the present disclosure, there is provided an information code generation system, characterized in that the information code generation system comprises:

a terminal that executes a process using an information code generated by arranging in a code region a plurality of light-color cells and dark-color cells; and a server that is communicable with the terminal;

the terminal includes:

a terminal-side communication unit that transmits predetermined information including data to be recorded in the information code to the server, and receives, from the server, code generation information for generating the information code in which the data is recorded in response to the transmission; and the generation unit that generates the information code based on the code generation information received from the terminal-side communication unit, and the server includes:

a server-side communication unit that receives the predetermined information from the server, and in response to the reception, transmits the code generation information to the terminal; and a setting unit that operates such that, when the predetermined information has been received from the terminal, the setting unit i) obtains an array pattern composed of the light-color cells and the dark-color cells arrayed in the code region, the array pattern being provided when the information code is generated so that the data included in the predetermined information is recorded in the code region, and ii) sets, as the code generation information transmitted by the server-side communication unit, information about the array pattern.

Additionally, as a second aspect of the present disclosure, there is provided an information code generation system, characterized in that the information code generation system comprises:

a printing apparatus for printing an information code in which the data is recorded by arranging in a code region a plurality of light-color cells and dark-color cells;

a control apparatus for instructing the printing apparatus to print; and a server that is communicable with the control apparatus, the server includes:

a setting unit that operates such that, when the information code is generated so that the data is recorded, the setting unit i) obtains an array pattern composed of the light-color cells and the dark-color cells arrayed in the code region, and ii) sets, as the code generation information including information about the array pattern; and a transmission unit that transmits to the control apparatus the code print information set by the setting unit, the control apparatus includes:

a receiving unit for receiving the code print information from the server;

a generation unit for generating print data for printing a figure specified from the array pattern included in the code print information received from the receiving unit; and an instruction unit for instructing to the printing apparatus the print data generated by the generation unit;

wherein the printing apparatus prints the information code based on the print data instructed from the control apparatus.

It should be noted that reference signs in parentheses and in the Solution to Problem indicate correspondency to specific means in the embodiments described later.

In the information code generation system according to the first aspect, when predetermined information including data to be recorded in the information code is transmitted to the server by the terminal-side communication unit of the terminal, a piece of code generation information for generating an information code in which the data is recorded is received from the server in response to the transmission, and the information code is generated by the generation unit based on the received code generation information. Then, in the server, when the predetermined information is received from the terminal by the server-side communication unit, an array pattern of the light-color cells and the dark color cells to be mapped in the code region is generated. The array pattern makes it possible to provides the information code with recording of the data included in the predetermined information. Then, the information on the array pattern is set by the setting unit as the code generation information, and is transmitted to the terminal by the server-side communication unit.

Thereby, in the process for generating the information code in which the data is recorded, the process for obtaining the array pattern of the light-color cells and the dark-color cells is performed by the server, and the process for forming the information code by arranging the light-color cells and the dark-color cells based on the obtained array pattern can be performed by the terminal. Hence, the load for generating the information code in the server can be reduced as compared with the case of performing the process up to the information code forming process based on the above-described array pattern in the server. In particular, the code generation information transmitted from the server to the terminal is information related to the array pattern of the light-color cells and the dark-color cells, and since the amount of information can be reduced as in the case of binary information, the amount of transmission can be reduced as compared with the case of transmitting the information code itself from the server to the terminal, so that the load for the transmission process and other necessary processes can be reduced. Therefore, it is possible to reduce the computation load for the communication of the server and the data processing, which are required to generate the information code from each terminal.

For example, in the information code, a free region (or a canvas region) different from the light-color cells and the dark-color cells is provided in the code region, and the predetermined information further includes the free region information related to the free region. Then, in the server, when the predetermined information is received from the terminal by the server-side communication unit, the array pattern of the light-color cells and the dark-color cells in the code region when the information code is generated so that the data included in the predetermined information is recorded and the free region based on the free region information is provided is obtained. Then, the information on the array pattern is set by the setting unit as the code generation information, and is transmitted to the terminal by the server-side communication unit.

This makes it possible to reduce the load on the server in generation of an information code in which a free region is provided in the code region. In particular, even when an information code is generated by arranging a predetermined image or the like in an empty area, it is not necessary to transmit the predetermined image or the like to the server, so that not only the amount of communication for transmission and reception of the predetermined image or the like can be reduced, but also the security of the predetermined image or the like can be enhanced because the predetermined image or the like is not transmitted from the terminal to the outside.

Further, for example, the predetermined information includes data to be recorded in each of a plurality of information codes. Then, in the server, when the predetermined information is received from the terminal by the server-side communication unit, the array pattern of the light-color cell and the dark-color cell in the code region when the information code is generated so that the data included in the predetermined information is recorded are respectively obtained. The information on these array patterns is set as code generation information by the setting unit and transmitted to the terminal by the server-side communication unit.

As a result, even when a plurality of information codes are generated at one time, the load on the server in generation can be reduced. In particular, it is not necessary to transmit information on the positional relationship, the size, and the like of each information code to the server, and the positional relationship, the size, and the like of each information code to be generated can be freely adjusted by the terminal, so that the convenience of the user who possesses the terminal can be enhanced.

On the other hand, according to the configuration of the second aspect, in the server, the array pattern of the light-color cells and the dark-color cells in the code region when the information code is generated so that the data is recorded is obtained, the code print information is set by the setting unit so as to include the information about the array pattern, and is transmitted to the control apparatus by the transmission unit. Then, in the control apparatus, when the code print information is received from the server by the receiving unit, print data for printing a figure specified from the array pattern included in the code print information is generated by the generation unit, and the print data is instructed to the printing apparatus by the instruction unit. Then, the information code is printed by the printing apparatus based on the print data instructed by the control apparatus.

Thereby, in the process for printing the information code in which the data is recorded, the process for obtaining an array pattern of the light-color cells and the dark-color cells is performed by the server, and the process for generating the print data of the figure specified from the obtained array pattern, that is, the print data of the information code can be performed by the control apparatus. Accordingly, no processing is needed by the server for producing a figure (imaging) of the information code to be generated, and the load on the server can be reduced as compared with the case where the information code is generated by the server. Further, the code print information transmitted from the server to the control apparatus is information related to the array pattern of the light-color cells and the dark-color cells, and since the amount of information can be reduced as in the case of binary information, the amount of transmission can be reduced as compared with the case where the information code itself is transmitted from the server to the control apparatus, so that the load on communication and calculation for the transmission process in the server can be reduced.

Therefore, it is possible to reduce the load on the server that generates information for printing the information code. In particular, in the control apparatus, only the print data for printing the figure specified from the array pattern is generated and instructed, and recognition of the shape of the information code to be printed or the like becomes unnecessary. Therefore, as compared with the case where the print data for printing the information code is generated and instructed after recognizing the data received from the server as the information code, the time from the reception of the data from the server to the instruction to the printing apparatus can be shortened, so that even a large number of information codes can be printed at high speed.

In the second aspect, for example, in the information code, a free region different from the light-color cells and the dark-color cells is provided in the code region. Then, in the server, the array pattern of the light-color cells and the dark-color cells in the code region when the information code is generated so that the data is recorded and the free region is provided is obtained. Then, the code print information is set by the setting unit so as to include the information on the array pattern, and is transmitted to the control apparatus by the transmission unit.

This makes it possible to reduce the load on the server in generation of an information code in which a free region is provided in the code region.

Further, for example, in the control apparatus, in addition to a figure specified from the array pattern included in the code print information received by the receiving unit, data for printing a printing target stored in the storage unit in a region corresponding to the free region of the figure is generated as print data by the generation unit.

As a result, even when the information code is printed so as to arrange the printing target in the free region, it is not necessary to transmit the printing target data to the server, so that the communication amount necessary for transmitting and receiving the printing target data can be reduced. In particular, since the data to be printed is not transmitted from the control apparatus to the outside of the server or the like, the security of the printing target can be enhanced.

Other advantageous effects will become apparent from the description of embodiments given with reference to the appended drawings.

BRIEF DESCRIPTION OF THE DRAWINGS

In the accompanying drawings:

FIG. 7 shows explanatory diagrams, in which part (A) of FIG. 7 is an explanatory diagram illustrating a code image for displaying the first information code of FIG. 6, and part (B) of FIG. 7 is an explanatory diagram illustrating a code image for displaying the second information code of FIG. 6.

FIG. 16 shows explanatory diagrams, in which part (A) of FIG. 16 is an explanatory diagram illustrating a figure corresponding to the first information code of FIG. 15, and part (B) of FIG. 16 is an explanatory diagram illustrating a figure corresponding to the second information code of FIG. 15.

Figure 18:
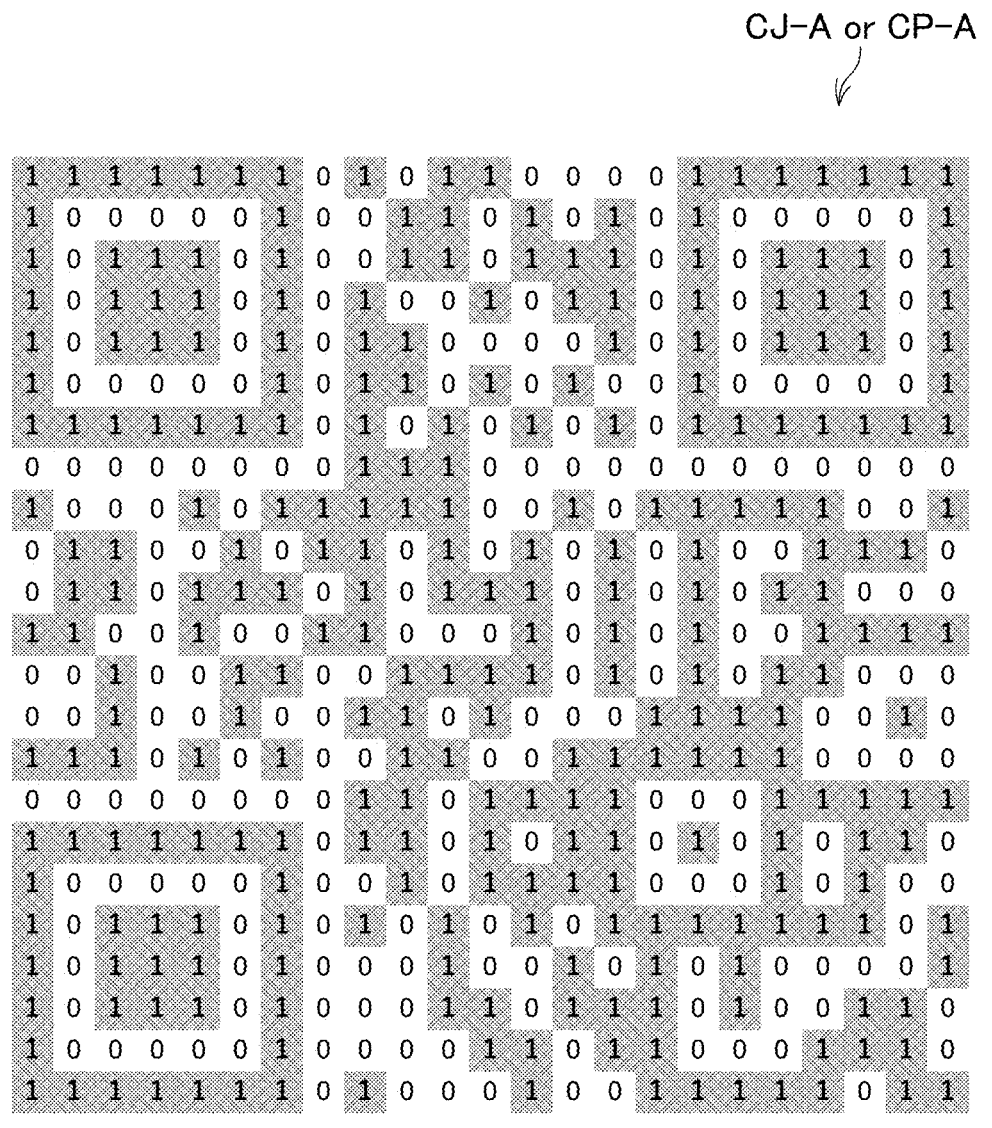

FIG. 18 is an illustration explaining a modification code generating information or code printing information which can be employed in the foregoing embodiments.

DETAILED DESCRIPTION OF THE PREFERRED EMBODIMENTS

First Embodiment

Hereinafter, a first embodiment of an information code generation system according to the present invention will be described with reference to the drawings.

The information code generation system 10 according to the present embodiment is a system that generates an information code used by each terminal by using an array pattern setting process performed by a server. More specifically, the information code generation system 10 is configured as a system that reduces the load on the server in generating an information code by performing a part of the generation processing for generating the information code by the server that has received the request for information code generation from the terminal and performing the generation processing of the remaining part by the terminal.

Figure 1:
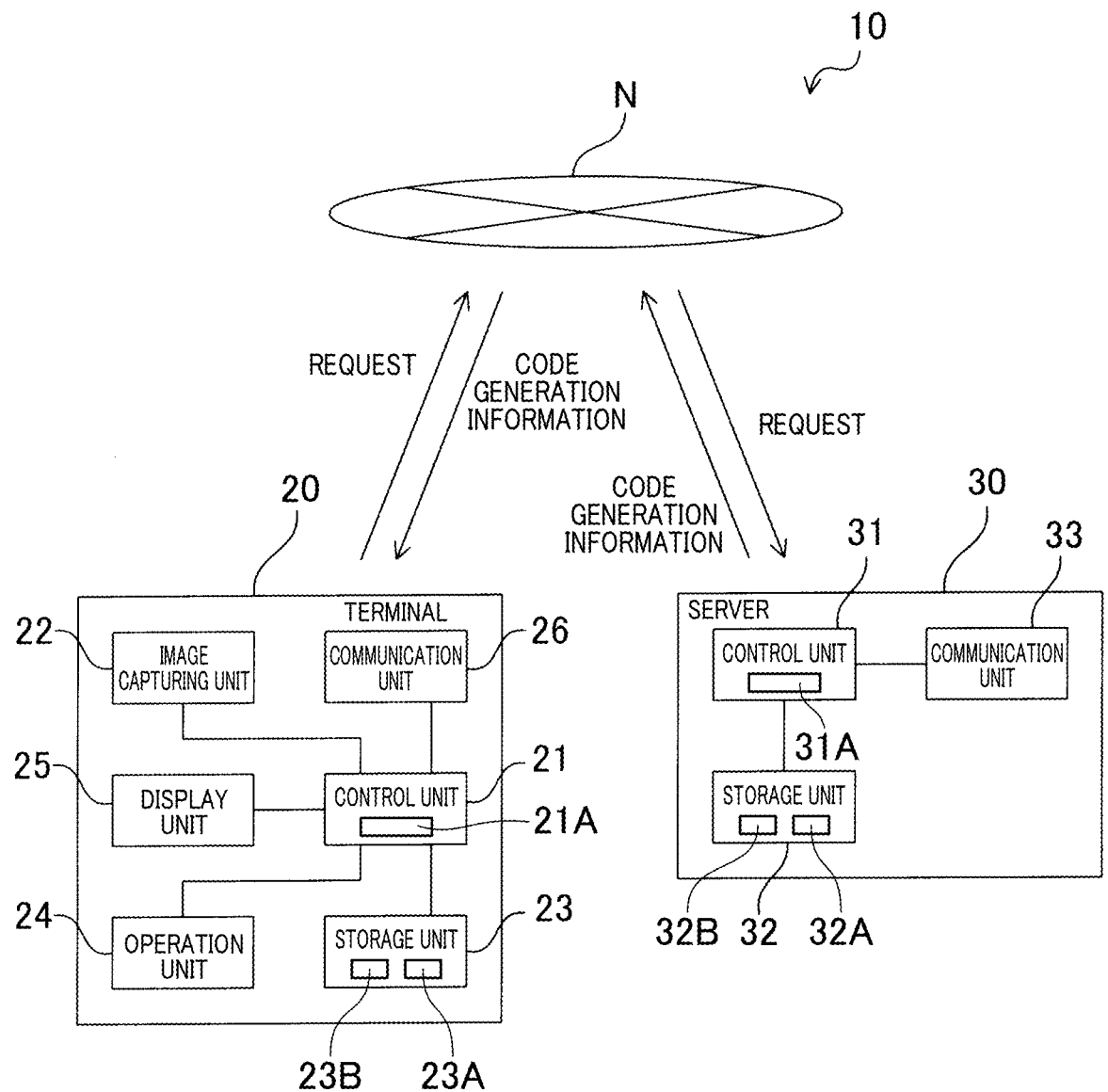
FIG. 1 is an explanatory diagram schematically showing the configuration of an information code generation system according to a first embodiment.

As shown in FIG. 1, the information code generation system 10 includes one or more portable terminals (hereinafter, simply referred to as terminals 20) using the information code, and a server 30 capable of communicating with each terminal 20. The terminal 20 and the server 30 are communicably connected via a network N such as the Internet or the like. In FIG. 1, for convenience, one terminal 20 is illustrated, and the other terminal 20 is omitted.

Figure 2:
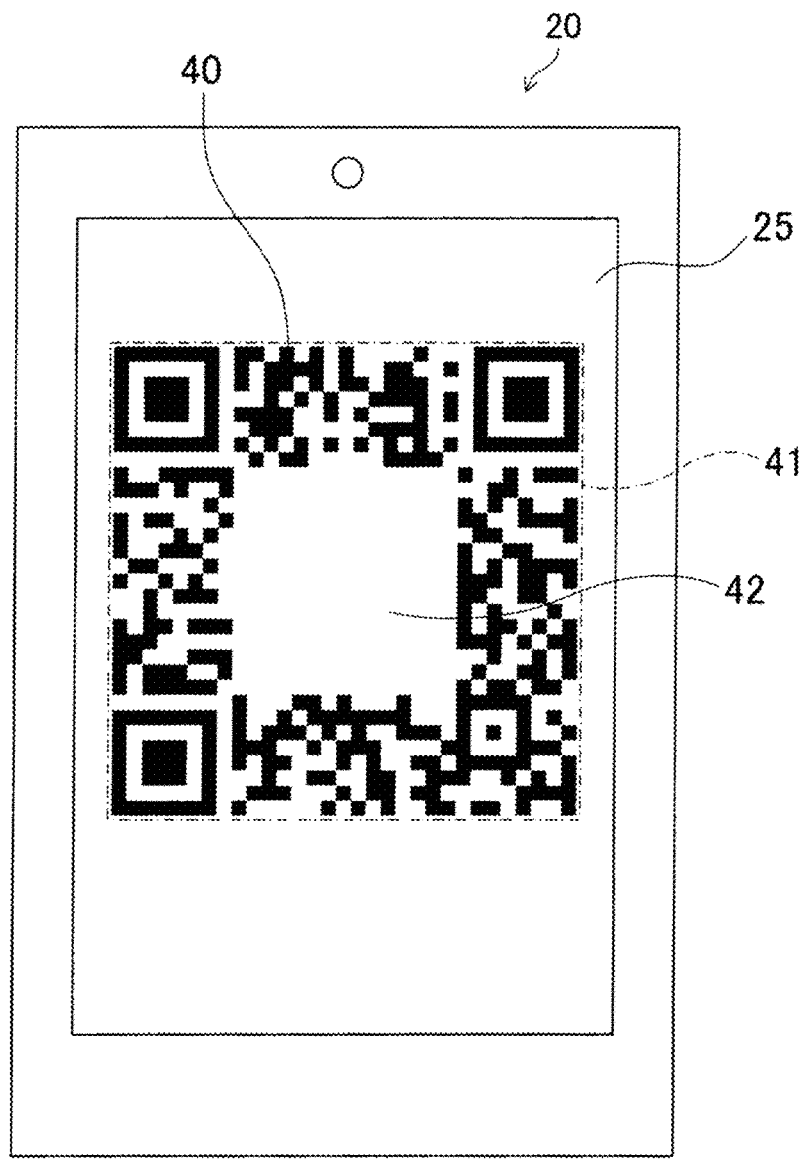
FIG. 2 is an explanatory diagram illustrating a portable terminal on which an information code is displayed on a screen.

First, the information code 40 used by the information code generation system 10 will be described. The information code 40 used in the present embodiment is used by being displayed on the screen of the terminal 20 in which a predetermined application program (hereinafter, simply referred to as generation application) for generating the information code 40 is installed. For example, as illustrated in FIG. 2, the information code 40 is generated such that predetermined or desired data is recorded by arranging a plurality of light-color cells and the dark-color cells in the code region 41.

More specifically, the information code 40 is configured by using a designated encoding technique such that the information code 40 has a rectangular (for example, square or oblong) code region 41 in which various pattern regions and recording regions are formed. Such regions include specific pattern regions, a data recording region, an error correction code recording region, and a free region (or a canvas region) 42. In the specific pattern regions, predetermined-shape specific patterns (such as three finder patterns (i.e., three specific patterns for detecting the position of an information code), timing patterns, and alignment patterns. In the data recording region, desired data which have been encoded are recorded by a plurality of light-color cells and dark-color cells. In the error correction code recording region, error correction codes are recorded by a plurality of the light-color cells and the dark-color cells. The free region 42 is arranged in a central part of the code region 41 as a region into which data is not recorded by the cells. The free region 42 is not subjected to error correction of the error correction codes. The free region 42 has a size larger than the single cell.

Therefore, the data recorded in the information code 40 can be read by using a reader (hereinafter referred to as a dedicated reader) that can perform decoding processing based on a designated decoding technique corresponding to the foregoing designated encoding technique. On the other hand, in a general reader which cannot perform the decoding processing based on the designated decoding technique, the data recorded in the information code 40 cannot be read.

Next, the configuration of the terminal 20 will be described.

The terminal 20 is configured as a portable terminal that can use the information code 40 by installing the above-described generation application to a smart phone or the like having a camera function. The terminal 20 includes a control unit 21 that processes image data captured on the basis of a pixel signal from the image capturing unit 22 that functions as an image capturing means.

The control unit 21 is mainly composed of a microcomputer, and includes a CPU 21A, a system bus (not shown), an input/output interface (not shown), and the like, and functions as an information processing apparatus together with the storage unit 23. The storage unit 23 is composed of various types of nonvolatile memories 23A including ROMs, flash memories, and HDDs, as well as known storage apparatuses such as a RAM 23B for temporarily storing data, and application programs and the like including the above-described generation applications and the like are stored in the nonvolatile memory 23A so as to be executable by the control unit 21, that is, the CPU 21A. Therefore, the nonvolatile memory 23A functions as a terminal-side nontransient computer readable recording medium.

In particular, in the present embodiment, terminal identification information that differs for each installed generation application is stored in the storage unit 23 (for example, RAM 23B) together with the terminal identification information that differs for each installed generation application. That is, the storage unit 23 functions as a storage means in which terminal identification information is stored, and the terminal identification information is set for each terminal 20 and also serves as information for specifying a generation application to be installed.

The terminal 20 includes an operation unit 24, a display unit 25, and a communication unit 26. The operation unit 24 includes various operation keys, a touch panel, and the like, and has a function of inputting information corresponding to an operation to the control unit 21. The display unit 25 is composed of a liquid crystal monitor or the like, and has a function of displaying the information code 40 or the like on a screen under the control of the control unit 21. The communication unit 26 is controlled by the control unit 21, and has a function as a terminal-side communication unit serving as a communication means for performing wireless communication with the server 30 or the like via the network N described above.

Next, the configuration of the server 30 will be described.

The server 30 is configured as a computer having a function of performing a part of processing for generating the information code 40. Specifically, when the data or other information to be recorded in the information code 40 is received from the terminal 20, the server 30 performs a process (hereinafter, also referred to as the array pattern setting process) for obtaining the array pattern of the light-color cells and the dark-color cells in the code region 41 using the designated encoding technique. This process allows the information code 40 to be generated so that the data is recorded in the code region 41. This array pattern setting process will be described later.

The server 30 mainly includes a storage unit 32, a communication unit 33, and a control unit 31 that comprehensively controls these units. The control unit 31 is mainly composed of a microcomputer, and includes a CPU 31A, a system bus (not shown), an input/output interface (not shown), and the like, and functions as an information processing apparatus together with the storage unit 32. The storage unit 32 is composed of various types of nonvolatile memories 32A including ROMs, flash memories, and HDDs, as well as a known storage device such as a RAM 32B for temporarily storing data, and in the nonvolatile memory 32A, application programs for executing the array pattern setting process, predetermined databases, and the like are stored in advance in the storage unit 32 so as to be usable by the control unit 31, i.e., a CPU 31A. Therefore, the nonvolatile memory 32A functions as a server-side non-transient computer readable recording medium.

The communication unit 33 is controlled by the control unit 31, and has a function as a server-side communication unit serving as a communication means for performing communication with each terminal 20 and other external apparatuses via the above-described network N.

Figure 3:
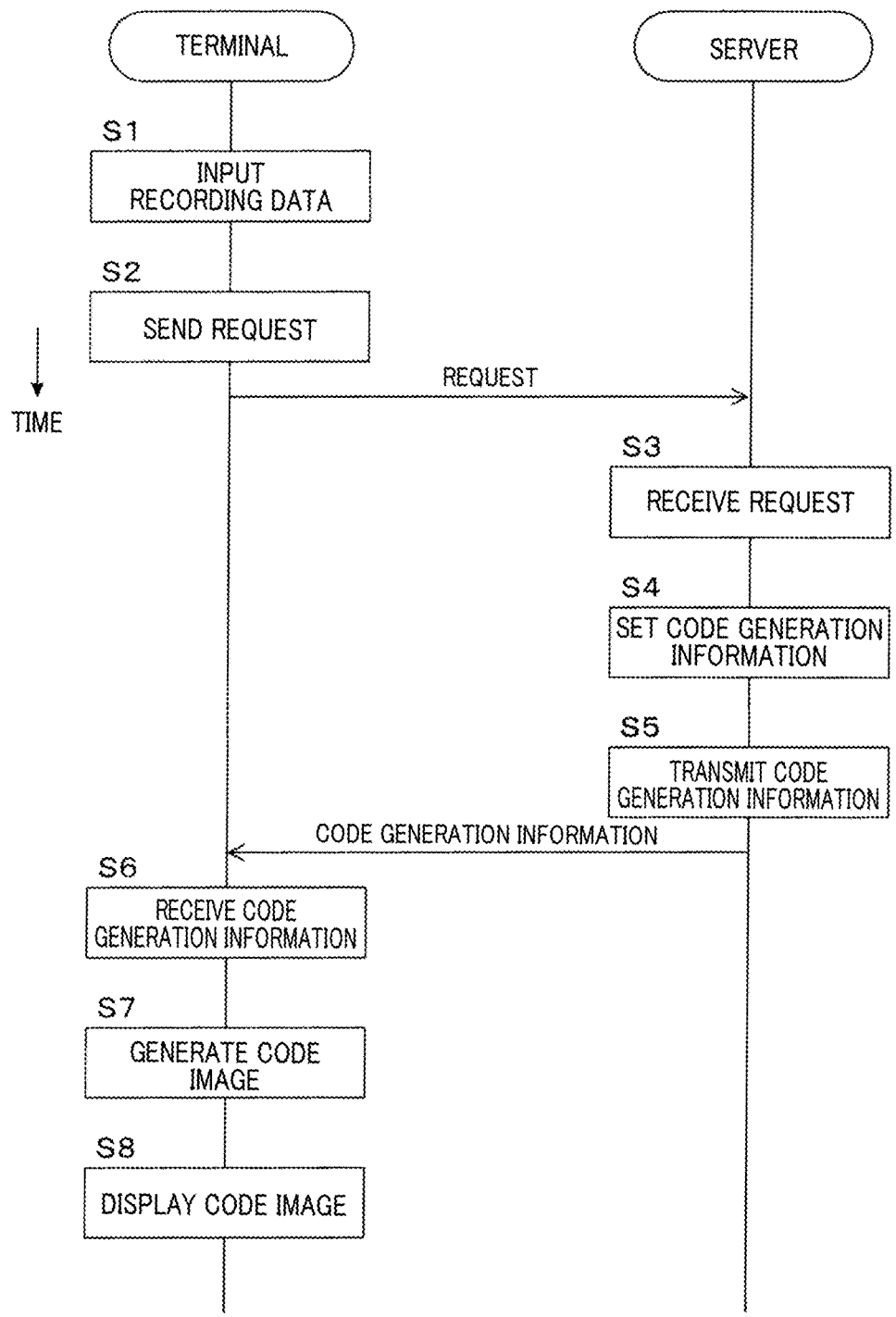
FIG. 3 is an explanatory diagram illustrating a process of generating an information code in the first embodiment.
Figure 4:
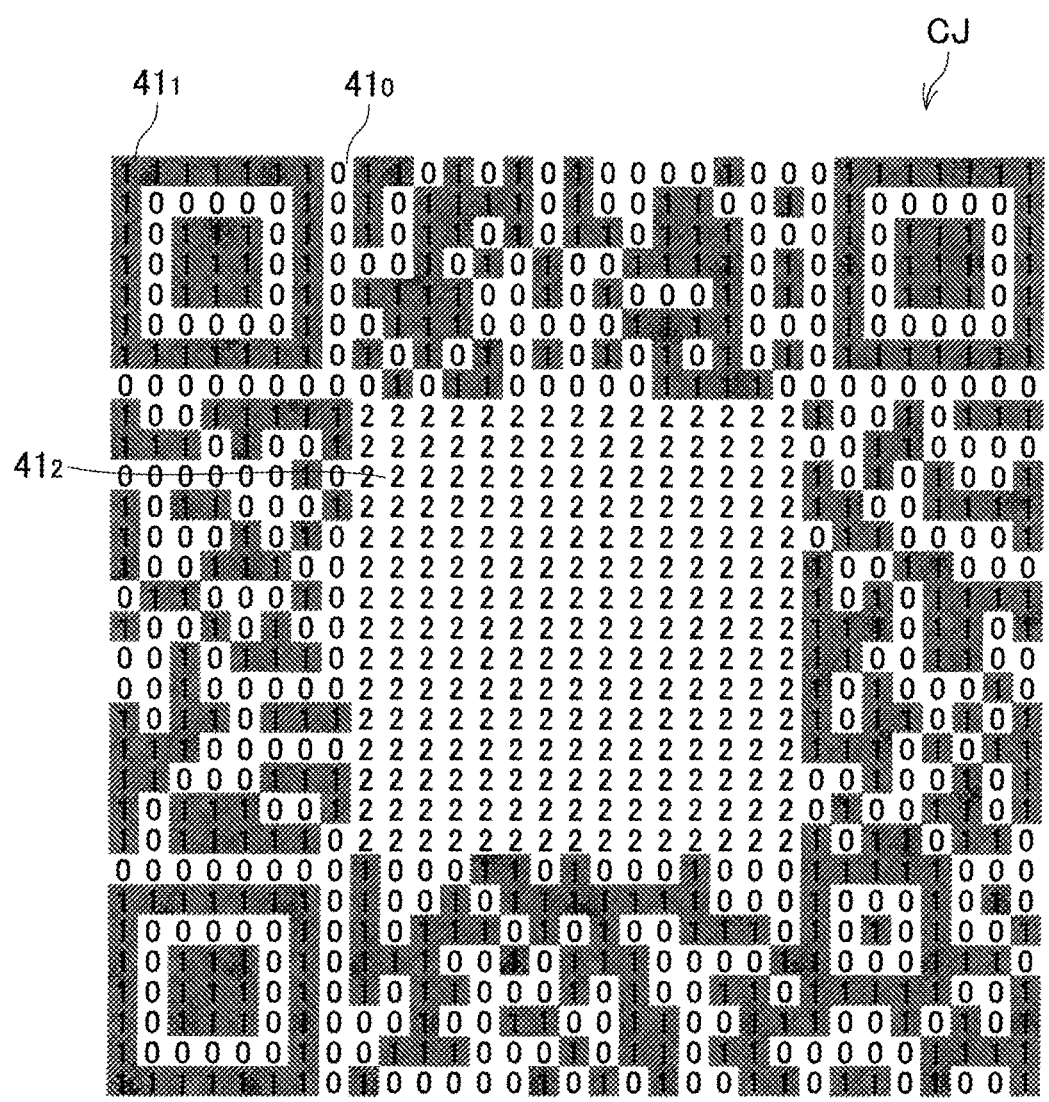
FIG. 4 is an explanatory diagram for describing code generation information corresponding to the information code shown in FIG. 2.

Next, with reference to FIGS. 3 and 4, a description will be given of processing performed when the information code 40 generated by using the server 30 is displayed on the terminal 20 on the screen in the information code generation system 10 configured as described above.

When the above-described generation application is executed by the control unit 21 by a predetermined control performed by a user who possesses the terminal 20, the terminal 20 enters recording data or the like to be recorded in the information code 40 in response to an operation of the operation unit 24 or the like. Then, when the user inputs recording data or the like in accordance with the operation of the operation unit 24 or the like (step S1 in FIG. 3), predetermined information including the input recording data, free region information, terminal identification information, or the like is transmitted as a request to the server 30 via the communication unit 26 (step S2). Here, the free region information is information related to the free region 42 including the presence, absence or the like of the free region 42, and depending on a designated encoding technique to be used, for example, information related to the shape, size, position, and the like of the free region 42 can also be included in accordance with the operation of the operation unit 24 or the like.

When the above-described request is received from the terminal 20 (step S3), the control unit 31 of the server 30 uses the foregoing designated encoding technique to perform an array pattern setting process for obtaining an array pattern of the light-color cells and the dark-color cells in the code region 41 when the information code 40 is generated so that the recording data included in the request is recorded and the free region 42 based on the free region information is provided.

Information on the array pattern set by the array pattern setting process is set as code generation information (step S4), and is transmitted to the terminal 20 via the communication unit 33 (step S5).

The code generation information is set so that the unit region in which the code region 41 is divided into a cell size is converted into three digits for each unit region. For example, the unit region corresponding to the light-color cell is set to be "0", the unit region corresponding to the dark-color cell is set to be "1", and the unit region corresponding to a part of the free region is set to be "2". Specifically, the code generation information corresponding to the information code 40 illustrated in FIG. 2 is set to be converted into three digits as illustrated in FIG. 4. The control unit 31 for setting the code generation information may correspond to an example of a "setting unit". In FIG. 4, for convenience, the unit regions corresponding to the dark color cells are hatched.

When the code generation information is received from the server 30 in response to the request transmission (step S6), the control unit 21 of the terminal 20 generates a code image for displaying a screen of the information code 40 based on the code generation information (step S7). For example, in the case where code generation information that has been converted into three digits is received as exemplified in FIG. 4, based on the numerical value for each unit region, a figure is generated in which the light-color cells and the dark-color cells are arranged in the code region 41 except for the free region 42 provided at the center of the code region 41 as shown in FIG. 2, and this generated figure becomes the code image of the information code 40 in which the recording data is recorded. The information code 40 generated in this manner is stored in the storage unit 23 so that it can be displayed on the display unit 25 at an arbitrary timing. The control unit 21 that generates the information code 40 based on the code generation information may correspond to an example of the "generation unit".

The user possessing the terminal 20 can cause the above-described dedicated reader to read the recording data recorded in the information code 40 by displaying on the screen the information code 40 generated as described above on the display unit 25 (step S8) and causing the dedicated reader to capture an image. As a result, the user can receive a service or the like using the above-mentioned recording data.

As described above, in the information code generation system 10 according to the present embodiment, when a request (predetermined information) including recording data to be recorded in the information code 40 is transmitted to the server 30 by the terminal 20, code generation information for generating the information code 40 in which the recording data is recorded is received from the server 30 in response to the transmission, and the information code 40 is generated based on the received code generation information. Then, when a request is received from the terminal 20, the server 30 obtains an array pattern of the light-color cells and the dark-color cells in the code region 41 when the information code 40 is generated so that the recording data included in the request is recorded, sets information on the array pattern as code generation information, and transmits the information to the terminal 20.

Thereby, among the process for generating the information code 40 in which the recording data is recorded, the process for obtaining the array pattern of the light-color cells and the dark-color cells is performed by the server 30, and the process for forming the information code 40 by arranging the light-color cells and the dark-color cells based on the obtained array pattern can be performed by the terminal 20. Therefore, as compared with the case where the information code 40 is generated by performing the processing up to the formation processing of the information code 40 based on the array pattern in the server 30, the load for generating the information code in the server 30 can be reduced.

In particular, since the code generation information transmitted from the server 30 to the terminal 20 is information related to the array pattern of the light-color cells and the dark-color cells, and the free region 42, it is possible to reduce the amount of information as in the case of the three digits information based on the unit region divided into the cell size. Therefore, compared with the case where the information code 40 itself is transmitted from the server 30 to the terminal 20, the amount of transmission is reduced, so that the load of communication and calculation for the transmission process and other necessary processes can be reduced.

For example, even in the case where the server 30 is used to generate a large number of information codes in which different recording data is recorded for each product in various manufacturing lines, each terminal provided in each manufacturing line can receive code generation information from the server 30 every time the recording data is transmitted, and can sequentially generate the information codes by the process of the control unit. Since the server 30 only needs to sequentially generate and transmit the code generation information, and not the information code itself, to the terminals of the respective manufacturing lines, the load on the server 30 is reduced. Therefore, even in the case of the information code 40 in which the free region 42 is provided in the code region 41, it is possible to reduce the load on the server 30 which is required to generate the information code 40 from each terminal.

Figure 5:
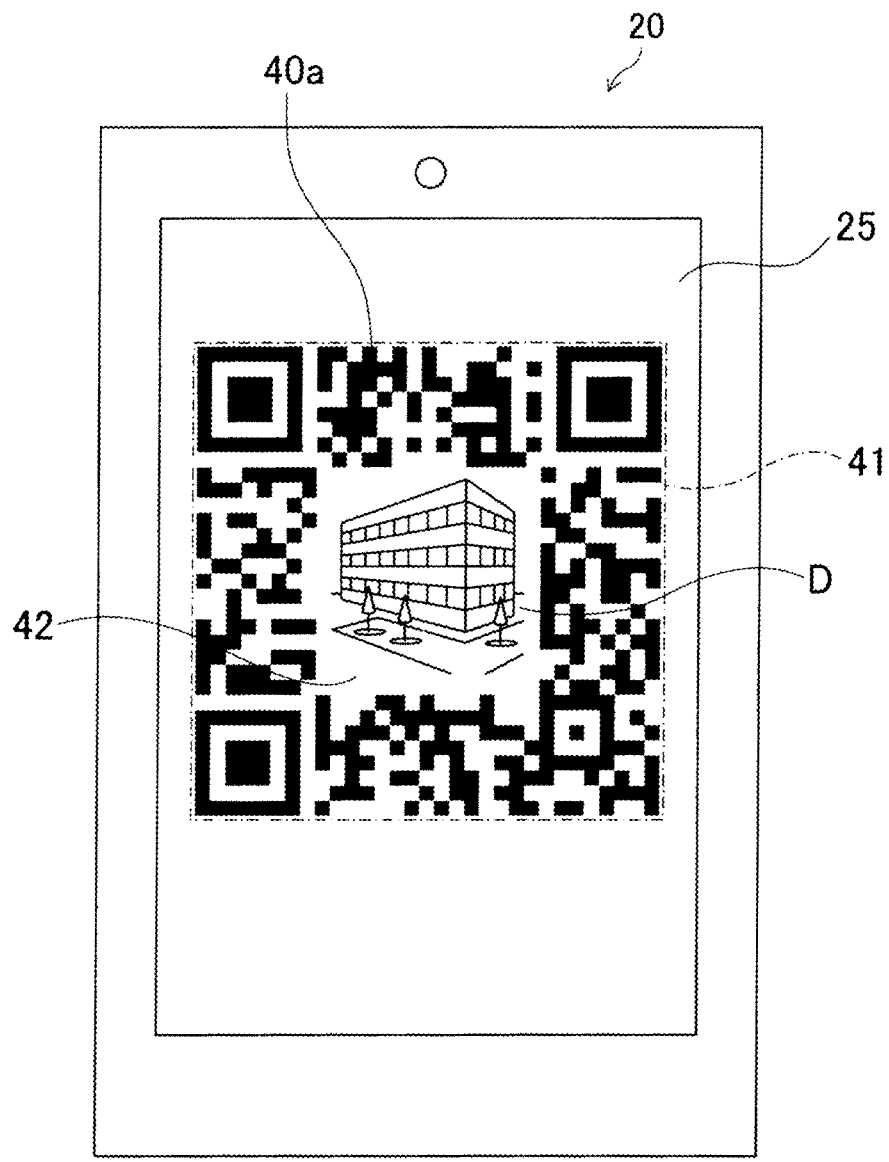
FIG. 5 is an explanatory diagram for describing a portable terminal in which an information code in which a predetermined image is arranged in a free region is displayed on a screen.

In particular, in each terminal, for example, as illustrated in FIG. 5, the information code 40a can be generated by arranging a predetermined image D in the free region 42. When such an information code 40a is generated, it is unnecessary to transmit a predetermined image D to the server 30, so that not only the amount of communication for transmission and reception of the predetermined image D can be reduced, but also the security of the predetermined image D can be enhanced because the predetermined image D is not transmitted from the terminal to the outside.

Further, when displaying the information codes 40 and 40a on the screen, each terminal is not limited to displaying the light-color cells as white and the dark-color cells as black, and two types of cells may be displayed by setting the two types of cells to colors that can be distinguished according to their gray levels or differences in luminance.

Note that the information code to be generated by the information code generation system 10 is not limited to being configured to be provided with the free region 42 as in the information code 40 illustrated in FIG. 2, and may be configured such that, for example, a specific pattern region, a data recording region, and an error correction code recording region are represented by a plurality of the light-color cells and the dark-color cells within the code region by using another designated encoding technique.

In this configuration, since the code generation information transmitted from the server 30 to the terminal 20 is information related to the array pattern of the light-color cells and the dark-color cells, the amount of information can be reduced as in the case of binary information with reference to the unit region divided into the cell size. Therefore, compared with the case where the information code itself is transmitted from the server 30 to the terminal 20, since the transmission amount is reduced, the load for the transmission process or the other necessary processes can be further reduced.

Second Embodiment

Figure 8:
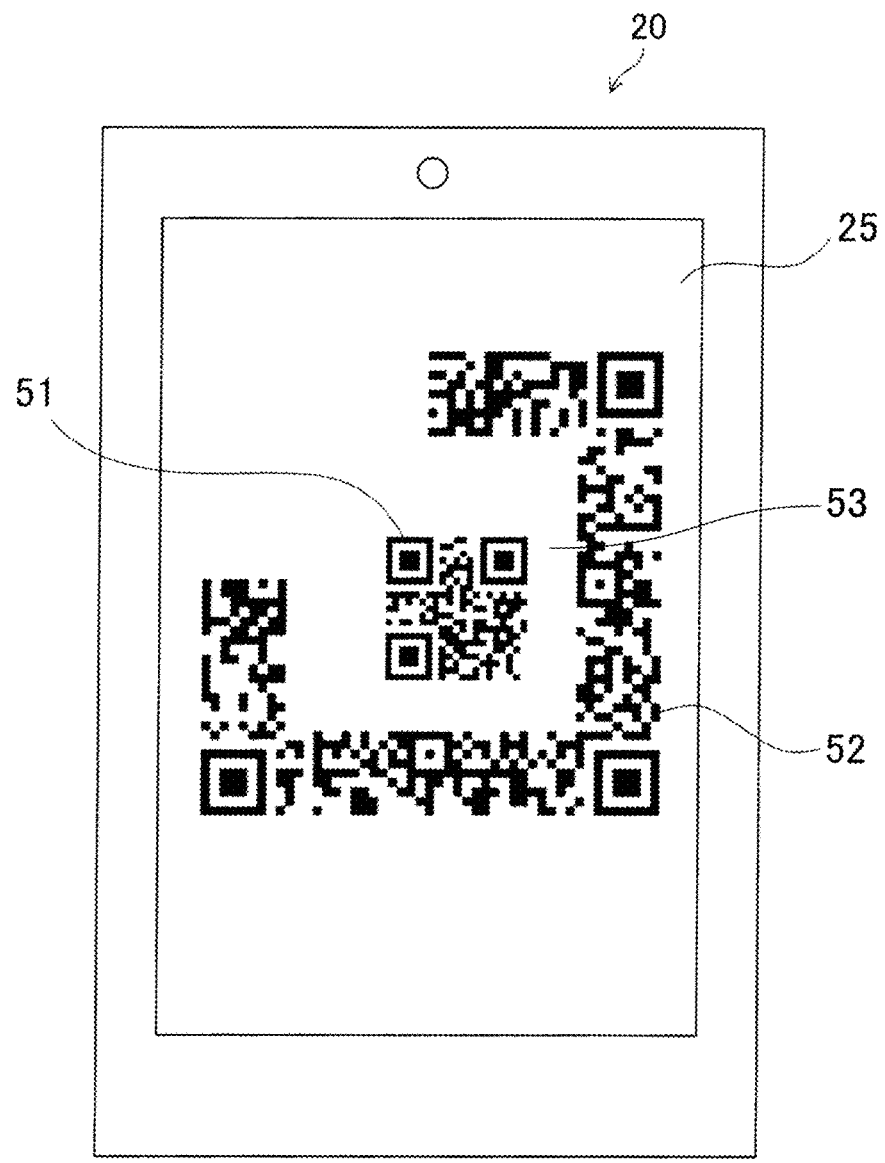
FIG. 8 is an explanatory diagram for describing a state in which the positional relationship and the size of two information codes are changed with respect to FIG. 6.

Next, an information code generation system according to a second embodiment of the present invention will be described with reference to FIGS. 6 to 8.

The information code generation system 10 according to the second embodiment generates a plurality of information codes to be simultaneously displayed. However, this embodiment is different from the information code generation system according to the above-described first embodiment. Therefore, the same components as those of the information code generation system of the first embodiment are denoted by the same reference numerals, and description thereof is omitted. It should be noted that the manner of explanation is the same in the following embodiments.

Figure 6:
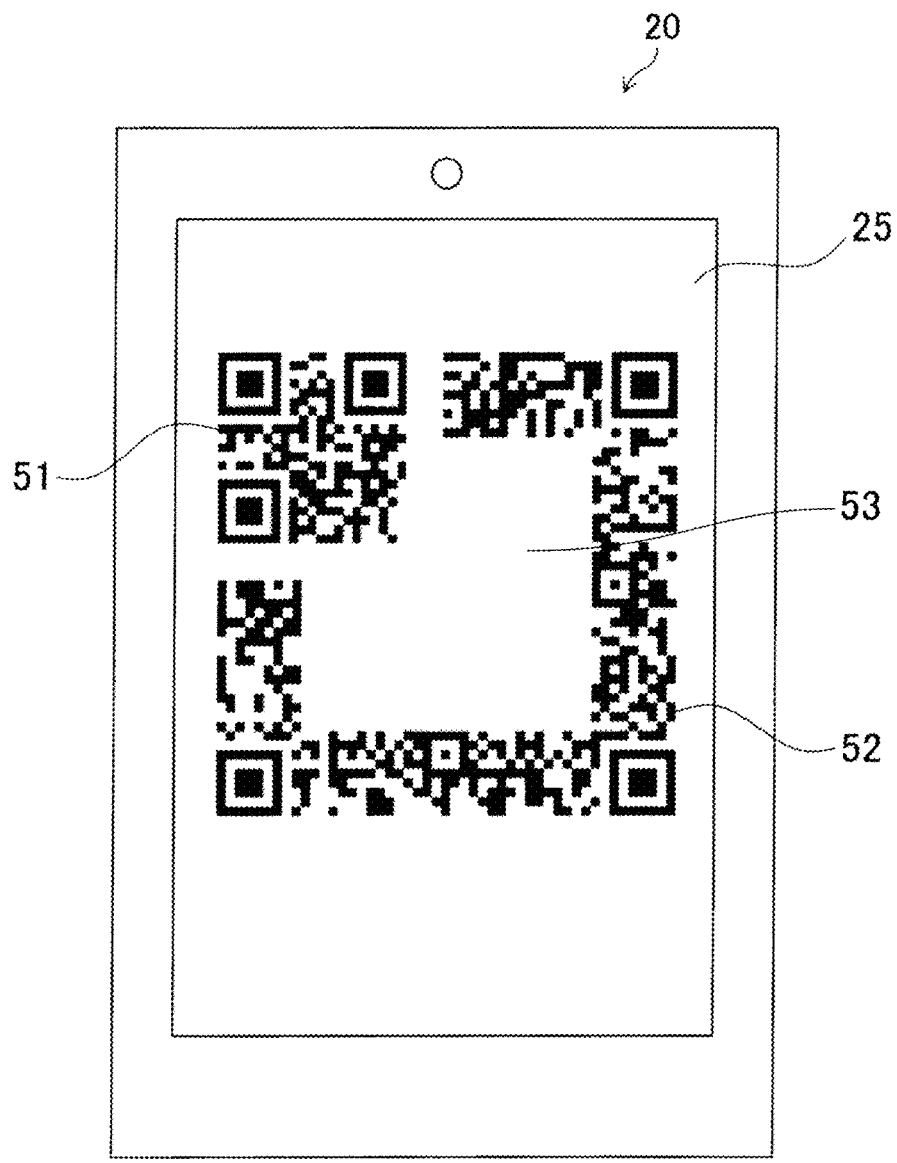
FIG. 6 is an explanatory diagram illustrating a portable terminal in which two information codes are displayed on a screen in a second embodiment.

In the present embodiment, as illustrated in FIG. 6, two information codes (hereinafter, also referred to as a first information code 51 and a second information code 52) generated by using the information code generation system 10 are simultaneously displayed on the display unit 25 in a predetermined positional relationship. On the other hand, the terminal 20 transmits the recording data to be recorded in the first information code 51 and the recording data to be recorded in the second information code 52 to the server 30, generates the first information code 51 and the second information code 52 from the received code generation information, and arranges them so as to have a predetermined positional relationship. That is, the server 30 obtains the array pattern without considering the positional relationship, the relative size, and the like of the first information code 51 and the second information code 52.

Hereinafter, in the present embodiment, processing when the first information code 51 and the second information code 52 generated by using the server 30 are displayed on the screen of the terminal 20 will be described with reference to FIG. 3 and the like.

When the above-described generation application is executed by the control unit 21 and the recording data and the like to be recorded in the first information code 51 and the second information code 52 are input (S1 in FIG. 3), predetermined information including the input recording data and the terminal identification information and the like is transmitted as a request to the server 30 via the communication unit 26 (S2)

When the request is received from the terminal 20 (S3), the control unit 31 of the server 30 uses the foregoing designated encoding technique to perform an array pattern setting process for obtaining an array pattern of the light-color cells and the dark-color cells in the code region 41 when the first information code 51 and the second information code 52 are generated so that the recording data included in the request is recorded, respectively. The information on the two array patterns set by the array pattern setting process is set as code generation information (S4), and is transmitted to the terminal 20 via the communication unit 33 (S5).

When the code generation information is received from the server 30 in response to the request transmission (S6), the control unit 21 of the terminal 20 individually generates, for example, a code image for screen display of the first information code 51 as illustrated in FIG. 7(A) and a code image for screen display of the second information code 52 as illustrated in FIG. 7(B) based on the code generation information (S7). The first information code 51 and the second information code 52 generated in this manner are stored in the storage unit 23 so that they can be displayed on the screen on the display unit 25 at an arbitrary timing.

Thereafter, when the first information code 51 and the second information code 52 are displayed on the screen in accordance with the user's operation, the first information code 51 and the second information code 52 read out from the storage unit 23 are displayed on the screen on the display unit 25 in accordance with a predetermined positional relationship, size, and the like determined in advance (S8: see FIG. 6). The first information code 51 and the second information code 52 displayed on the screen in this manner are collectively imaged by the dedicated reader described above, whereby the dedicated reader can read the recording data recorded in the first information code 51 and the second information code 52, respectively. As a result, the user can receive a service or the like using the above-mentioned recording data.

As described above, in the information code generation system 10 according to the present embodiment, the request (predetermined information) transmitted from the terminal 20 to the server 30 includes recording data to be recorded in each of a plurality of information codes. Then, when a request is received from the terminal 20, the server 30 obtains the array pattern of the light-color cells and the dark-color cells in the code region when each information code is generated so that the recording data included in the request is recorded, respectively, sets information on these array patterns as code generation information, and transmits the code generation information to the terminal 20.

As a result, even when a plurality of information codes are generated at one time as in the two first information codes 51 and the second information code 52 described above, the load on the server 30 for the generation can be reduced. In particular, it is not necessary to transmit information on the positional relationship, the size, and the like of each information code, to the server 30. The positional relationship, the size, and the like of each information code to be generated can be freely adjusted by the terminal. For example, when the first information code 51 and the second information code 52 are displayed on the screen, the positional relationship and the size of the first information code 51 and the second information code 52 can be changed with respect to FIG. 6, as illustrated in FIG. 8, in accordance with the operation of the operation unit 24 or the like. As a result, the convenience of the user who possesses the terminal 20 can be enhanced.

Modifications

It should be noted that the present invention is not limited to the above-mentioned embodiments and variations, and may be embodied as follows, for example.

(1) In the information code generation system 10 according to the present invention, the generated information codes 40, 40a, 51, and 52 are not limited to being displayed on the screen of the terminal 20 and used, but may be utilized by being printed on a predetermined print medium using, for example, a printing apparatus (not shown) that has received a print instruction from the terminal 20.

(2) The request transmitted from the terminal 20 to the server 30 may include the type or the like of the generated information code.

In this case, the server 30 can obtain the array pattern as described above by using the encoding technique corresponding to the specified type or the like.

(3) The terminal 20 is not limited to being configured as a portable terminal such as a smartphone, or the like, but may be configured as, for example, a stationary terminal or the like arranged on a manufacturing line or the like using the generated information code.

Third Embodiment

Hereinafter, a third embodiment of the information code generation system according to the present invention will be described with reference to the drawings.

The information code generation system 10A according to the present embodiment is a system that generates an information code, to be printed using a printing apparatus, by using an array pattern setting process performed by a server. More specifically, the information code generation system 10A is configured as a system that reduces the load on the server necessary for the information code generation by performing a part of the generation processing for generating the information code by the server that has acquired the recording data to be recorded in the information code, and performing the generation processing of the remaining part by the control apparatus that instructs the printing apparatus to print.

Figure 9:
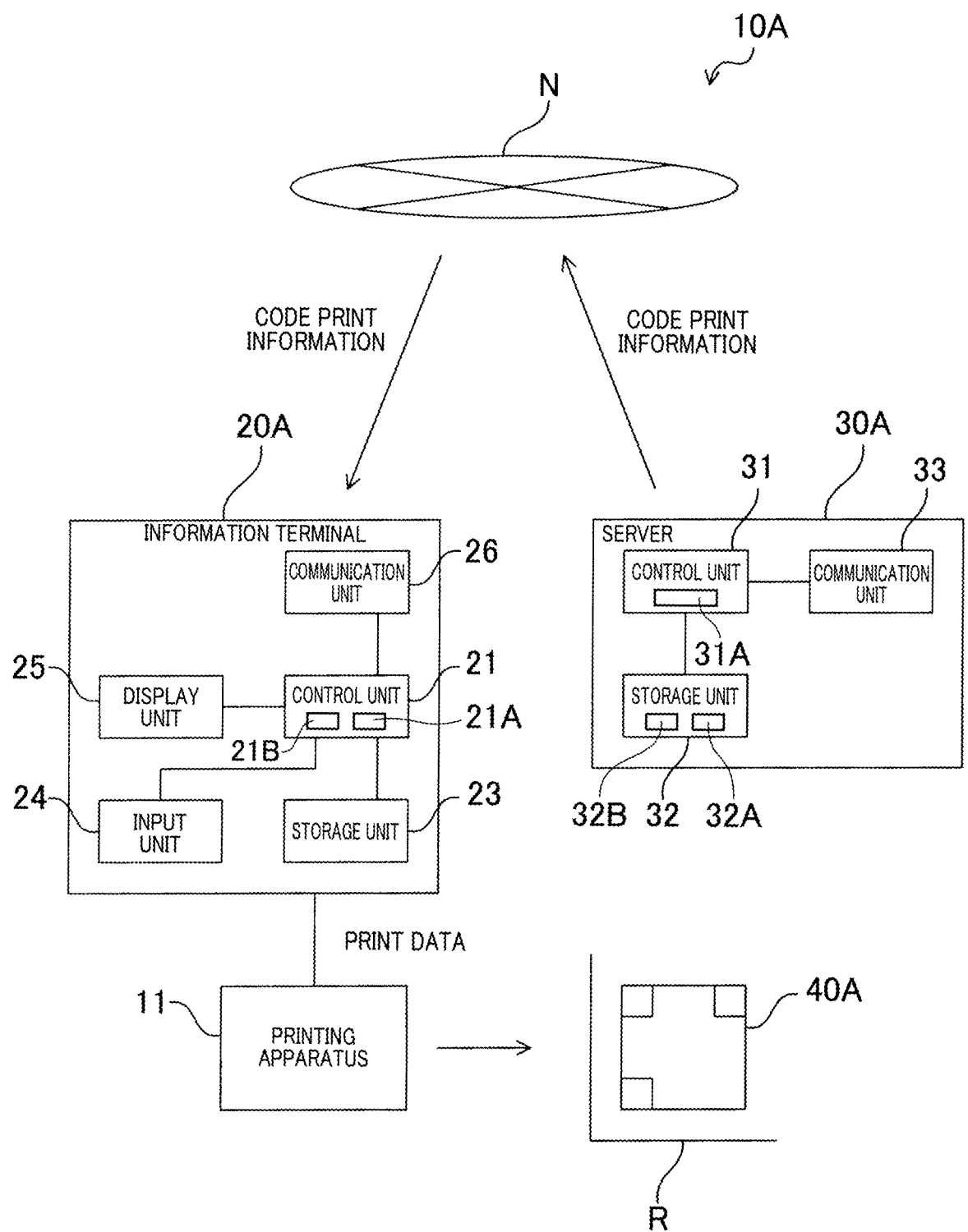
FIG. 9 is an explanatory diagram schematically showing a configuration of an information code generation system according to a third embodiment.

As shown in FIG. 9, the information code generation system 10A includes one or more terminals (information terminals such as a portable terminal and a fixed terminal) 20A functioning as a control apparatus that can control the printing apparatus 11, and a server 30A that can communicate with each terminal 20A. Each terminal 20A and the server 30A are communicably connected via a network N such as the Internet. In FIG. 9, for convenience, one terminal 20A is illustrated, and the other terminal 20A is omitted.

Figure 10:
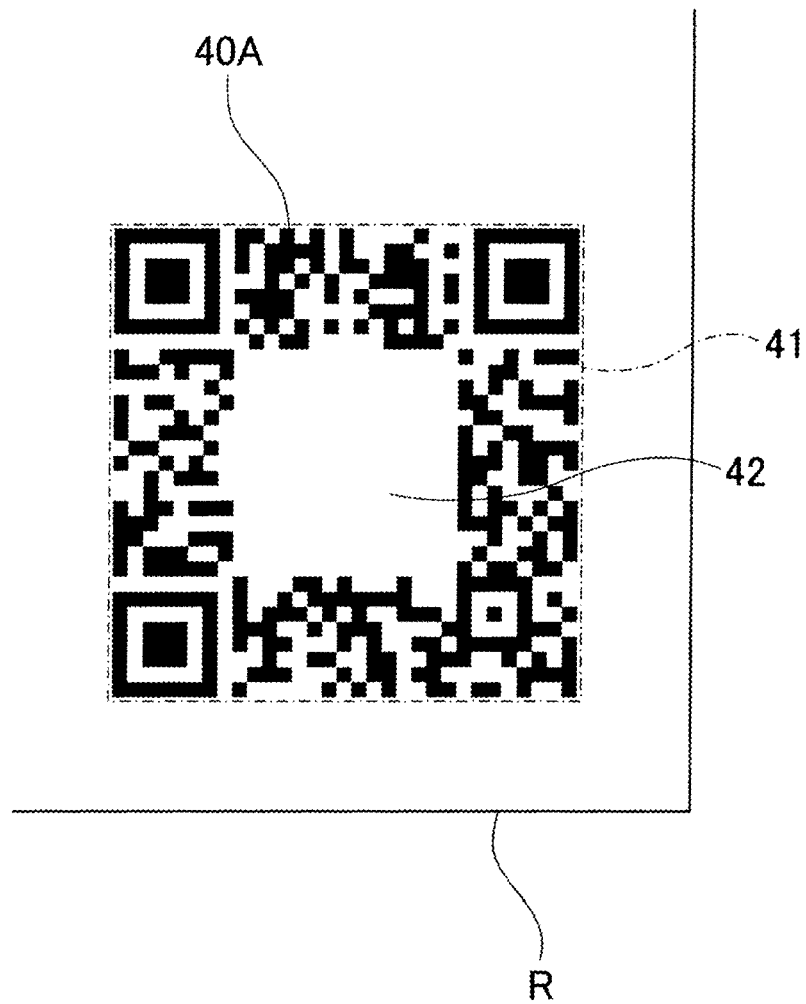
FIG. 10 is an explanatory diagram illustrating an information code printed on a print medium.

First, the information code 40A used by the information code generation system 10A will be described. The information code 40A used in the present embodiment is printed by the printing apparatus 11 when a print instruction is issued from the terminal 20A in which a predetermined application program (hereinafter, simply referred to as generation application) for generating the information code 40A is installed. For example, as illustrated in FIG. 10, the information code 40A is generated by arranging a plurality of light-color cells and the dark-color cells in the code region 41 so that predetermined recording data is recorded, and is printed on the print medium R.

More specifically, the information code 40A is configured by using a designated encoding technique such that the information code 40 has a rectangular (for example, square or oblong) code region 41 in which various pattern regions and recording regions are formed. Such regions include specific pattern regions, a data recording region, an error correction code recording region, and a free region (or a canvas region) 42. In the specific pattern regions, predetermined-shape specific patterns (such as three finder patterns (i.e., three specific patterns for detecting the position of an information code), timing patterns, and alignment patterns. In the data recording region, desired data which have been encoded are recorded by a plurality of light-color cells and dark-color cells. In the error correction code recording region, error correction codes are recorded by a plurality of the light-color cells and the dark-color cells. The free region 42 is arranged in a central part of the code region 41 as a region into which data is not recorded by the cells. The free region 42 is not subjected to error correction of the error correction codes. The free region 42 has a size larger than the single cell.

Therefore, the data recorded in the information code 40A can be read by using a reader (hereinafter referred to as a dedicated reader) capable of performing decoding processing based on a designated decoding technique corresponding to the designated encoding technique. On the other hand, in a general reader which cannot perform the decoding processing based on the foregoing designated decoding technique, the data recorded in the information code 40A cannot be read.

Next, the configuration of the terminal 20A will be described.

The terminal 20A is configured as a computer that uses the information received from the server 30A to issue a print instruction to the printing apparatus 11 by installing the above-described generation application. The terminal 20A is configured, for example, as a stationary type, and is arranged together with the printing apparatus 11 on a manufacturing line on which a print medium R for printing the information code 40 is conveyed.

The terminal 20A mainly includes a control unit 21 (having a CPU21A) for comprehensively controlling the entire terminal 20A, a storage unit 22, an input unit 23, a display unit 24, a communication unit 25, and the like. The control unit 21 is configured mainly as a microcomputer, and includes a CPU, a system bus, an input/output interface, and the like, and functions as an information processing apparatus together with the storage unit 22. This configuration is the same as the configuration described above. In particular, the communication unit 25 is configured to have a function as a communication means that is controlled by the control unit 21 and performs communication with external devices such as the server 30A and the printing apparatus 11 or the like.

The terminal 20A configured as described above generates print data for printing the information code 40 using the information received from the server 30A by the print instruction processing performed by the control unit 21 according to the above-described generation application, and issues a print instruction based on the print data to the printing apparatus 11. The printing apparatus 11 is configured as a known printer, and functions to print a figure (i.e., information code 40) or the like corresponding to a print instruction on a print medium R. The printing apparatus 11 can be configured as an apparatus for printing on various types of print media, such as a laser marker having a built-in print control function, for example.

Next, the configuration of the server 30A will be described.

The server 30A is configured as a computer having a function of performing a part of process for generating the information code 40A. Specifically, the server 30A uses the designated encoding technique described above to perform process for obtaining the array pattern of the light-color cells and the dark-color cells in the code region 41 when the information code 40A is generated so that desired data is recorded. Then, the code print information transmission process is performed to set the code print information so as to include the information on the array pattern obtained in this matter and transmit the code print information to the terminal 20A.

The server 30A mainly includes a control unit 31 (having a CPU31A) for comprehensively controlling the entire server 30A, a storage unit 32, a communication unit 33, and the like. This configuration is the same as the configuration of the server described in the embodiment described above.

Next, processing performed when the information code 40A generated using the server 30A is printed by the printing apparatus 11 in the information code generation system 10A configured as described above will be described with reference to FIGS. 11 to 13. In the following description, a case where predetermined information including data recorded in each information code is transmitted from the terminal 20A to the server 30A will be described in detail.

Figure 11:
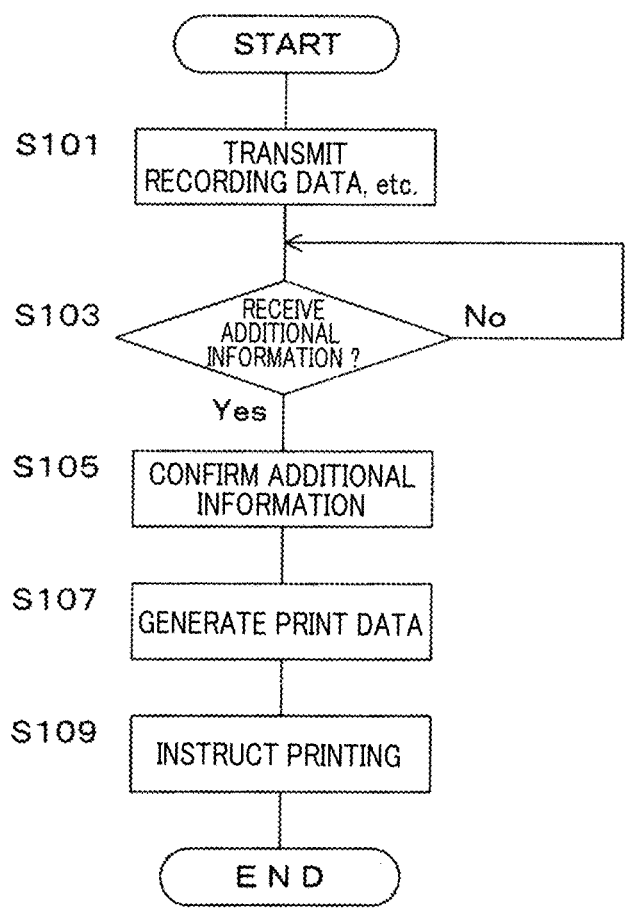
FIG. 11 is a flowchart illustrating a flow of print instruction processing by the control unit of the information terminal.
Figure 12:
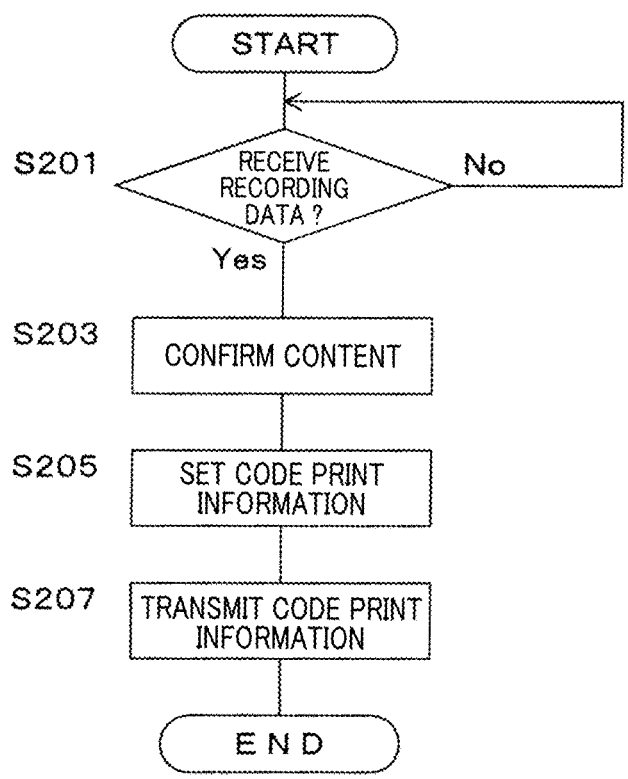
FIG. 12 is a flowchart illustrating a flow of code print information transmission process by the control unit of the server.

When the control unit 21 starts the print instruction process by performing predetermined operations for executing the generation application by an administrator or the like managing the terminal 20A, predetermined information including the data recorded in the information code 40A to be printed, the number thereof, the free region information, and the like is transmitted as a request to the server 30A via the communication unit 25 (step S101 in FIG. 11). Here, the free region information is information related to the free region 42 such as the presence or absence of the free region 42, and depending on a designated encoding technique to be used, for example, information related to the shape, size, position, and the like of the free region 42 can also be included in accordance with an input operation or the like of the input unit 23.

Note that the predetermined information including the recorded data, the free region information, and the like is not limited to being transmitted from the terminal 20A to the server 30A, and may be transmitted from another external device or the like to the server 30A.

In this case, information on the size, color, lightness, cell shape, and the like of the information code 40A can be included in the predetermined information as additional information. The server 30A itself may generate and acquire predetermined information including recorded data, free region information, and the like in accordance with predetermined conditions set in advance.

On the other hand, when the server 30A receives the above-described recorded data or the like as a request while the control unit 31 starts the code print information transmitting process (Yes in step S201 of FIG. 12), the server 30A confirms the type, number, or the like of the information code to be generated for the received data or the like (step S203). Next, using the designated encoding technique described above, an array pattern setting process is performed for obtaining the array pattern of the light-color cells and the dark-color cells in the code region 41 when the received data is recorded and the information code 40A is generated so that the free region 42 based on the free region information is provided.

Figure 13:
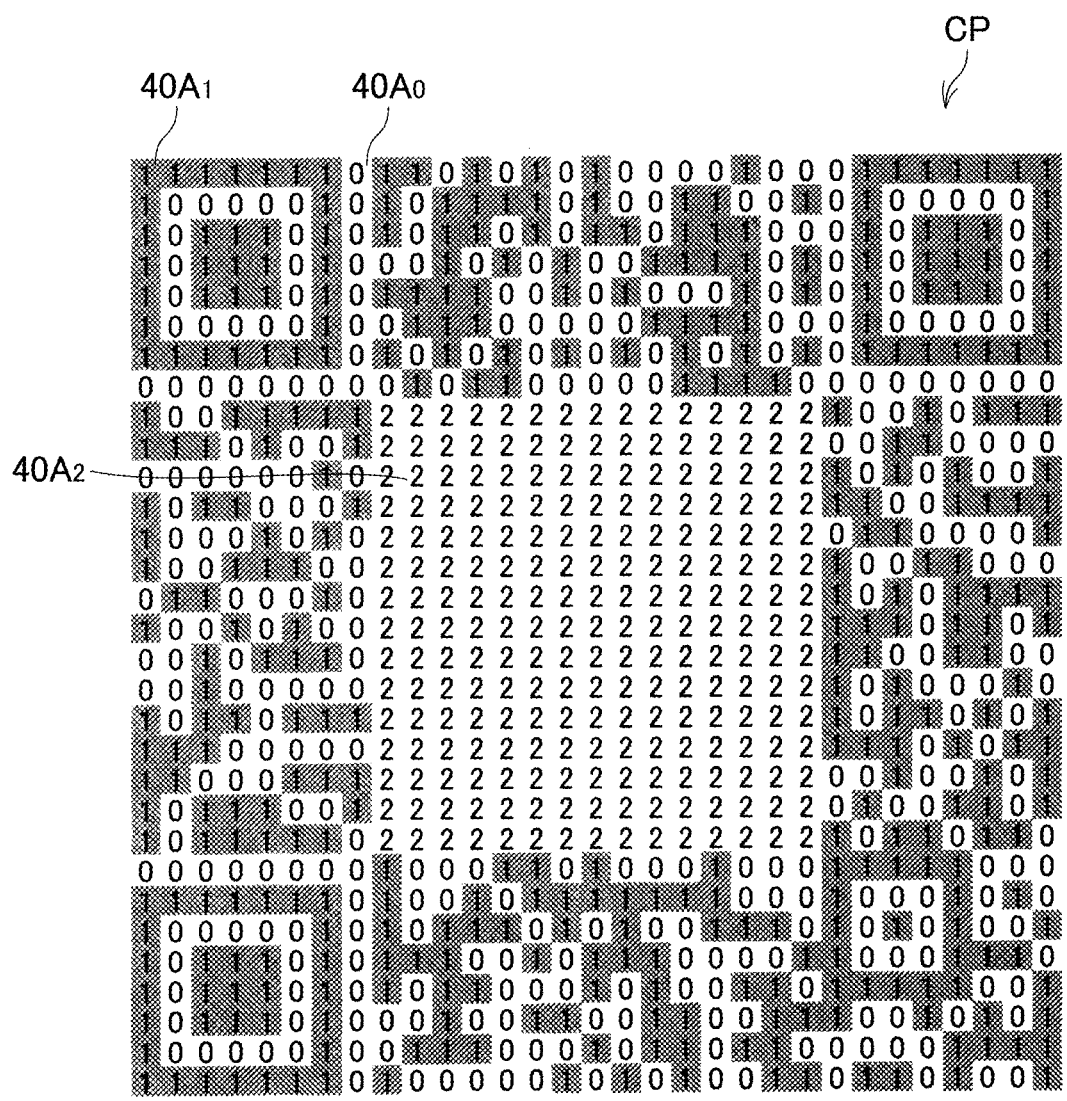
FIG. 13 is an explanatory diagram for describing code print information corresponding to the information code shown in FIG. 10.

Then, the state on the respective array patterns set by the array pattern setting process is set as code print information (step S205), and if needed, the information is transmitted to the terminal 20A via the communication unit 33 with the additional information such as a size, color and the like of the information code 40A added (step S207). For each information code 40A, the code print information is set so that the unit region in which the code region 41 is divided into a cell size is converted into three digits for each unit region. For example, the unit region corresponding to the light-color cells is set to be "0," the unit region corresponding to the dark-color cell is set to be "1," and the unit region corresponding to a part of the free region is set to be "2." Specifically, the code print information corresponding to the information code 40A shown in FIG. 10 is converted into three digits as illustrated in FIG. 13. The control unit 31 for setting the code print information corresponds to an example of the "setting unit", and the communication unit 33 for transmitting the code print information to the terminal 20A under the control of the control unit 31 corresponds to an example of the "transmission unit". In FIG. 5, for convenience, the unit regions corresponding to the dark-color cells are hatched.

In the terminal 20A, when the code print information or the like is received from the server 30A via the communication unit 25 in response to the transmission of the request as described above (Yes in step S103), the additional information added to the code print information is confirmed (step S105). The communication unit 25 that is controlled by the control unit 21 and receives code print information from the server 30A may correspond to an example of a "receiving unit".

Next, print data for printing is generated in accordance with the additional information for which the figure specified from the array pattern included in the received code print information has been confirmed (step S107). For example, in the case where the code print information which has been converted into three digits as illustrated in FIG. 13 is received, a figure is generated based on the numerical value for each unit region, in which the light-color cells and the dark-color cells are arranged in the code region 41 except for the free region 42 provided at the center of the code region 41 as illustrated in FIG. 10. The generated figure is printed to form the information code 40A in which the desired data is recorded. The control unit 21 that generates print data for printing a figure specified from the array pattern may correspond to an example of the "generation unit".

Then, the print data generated as described above is instructed to the printing apparatus 11 (step S109). As a result, printing processing based on the instructed print data is performed by the printing apparatus 11, whereby the information code 40A is printed on the print medium R as illustrated in FIG. 2. Note that the control unit 21 that instructs the printing apparatus 11 of the generated print data may correspond to an example of the "instruction unit".

As described above, in the information code generation system 10A according to the present embodiment, in the server 30A, the array pattern of the light-color cells and the dark-color cells in the code region 41 when the information code 40A is generated so that the desired data is recorded is obtained, the code print information is set so as to include the information about the array pattern, and the information is transmitted to the terminal 20A. When the code print information is received from the server 30A, the terminal 20A generates print data for printing a figure specified from the array pattern included in the code print information, and instructs the printing apparatus 11 to perform the print data. Then, the information code 40A is printed by the printing apparatus 11 based on the print data instructed by the terminal 20A.

As a result, among the process for printing the information code 40A in which the desired data is recorded, the process for obtaining the array pattern of the light-color cells and the dark-color cells is performed by the server 30A, and the process for generating the print data of the figure specified from the obtained array pattern, that is, the print data of the information code 40A can be performed by the terminal 20A. For this reason, no processing is needed by the server 30A for producing a figure (image) of the information code to be generated, and the load on the server 30A can be reduced as compared with the case where the server 30A generates the information code 40A. Further, the code print information transmitted from the server 30A to the terminal 20A is information on the array pattern of the light-color cells and the dark-color cells and the free region 42, and the amount of information can be reduced as in the case of the three-digit information based on the unit region divided into the cell size, and therefore, the amount of transmission can be reduced as compared with the case of transmitting the image of the information code 40A itself from the server 30A to the terminal 20A, so that the load for the transmission process in the server 30A can be reduced.

Therefore, it is possible to reduce the load on the server 30A that generates information for printing the information code 40A while keeping the designated encoding technique non-disclosed. As described above, since the array pattern of the information code 40A is generated by the server 30A using the designated encoding technique and the print data is generated from the figure based on the received array pattern without considering the designated encoding technique in the terminal 20A, the information code 40A can be generated with enhanced security without any omission of the generation method of the information code 40A or the like. In addition, even when the generation algorithm changes due to the version upgrade of the designated encoding technique, since the printing-related processing is not changed in the terminal 20A or the printing apparatus 11, the convenience of the system can be enhanced.

In particular, in the terminal 20A, only the print data for printing a figure specified from the array pattern is generated and instructed, and it is unnecessary to recognize the shape of the information code 40A to be printed. Therefore, as compared with the case where the data received from the server 30A is recognized as the information code 40A and the print data for printing the information code 40A is generated and instructed, the time from the reception of the data from the server 30A to the instruction to the printing apparatus 11 can be shortened, so that even a large number of information codes, 40A, can be printed at high speed.

In the information code 40A, a free region 42 different from the light-color cells and the dark-color cells is provided in the code region 41. Then, in the server 30A, the array pattern of the light-color cells and the dark-color cells in the code region 41 when the information code 40A is generated so that the desired data is recorded and the free region 42 is provided is obtained, the code print information is set so as to include the information on the array pattern, and the information is transmitted to the terminal 20A.

For example, even in the case where the server 30A is used to generate a large number of information codes in which different data are recorded for each product in various manufacturing lines, the terminal 20A provided in each manufacturing line can receive code print information from the server 30A in response to transmit of recorded data or the like, and can sequentially instruct printing of the information codes by process of the control unit. Since the server 30A only needs to sequentially generate and transmit the code print information, not the information code 40A itself, to the terminal 20A of each manufacturing line, the load on the server 30A is reduced. Therefore, even in the case of the information code 40A in which the free region 42 is provided in the code region 41, it is possible to reduce the communication and computation load of the server 30A for which generation of the information code 40A is required from each terminal 20A.

Figure 14:
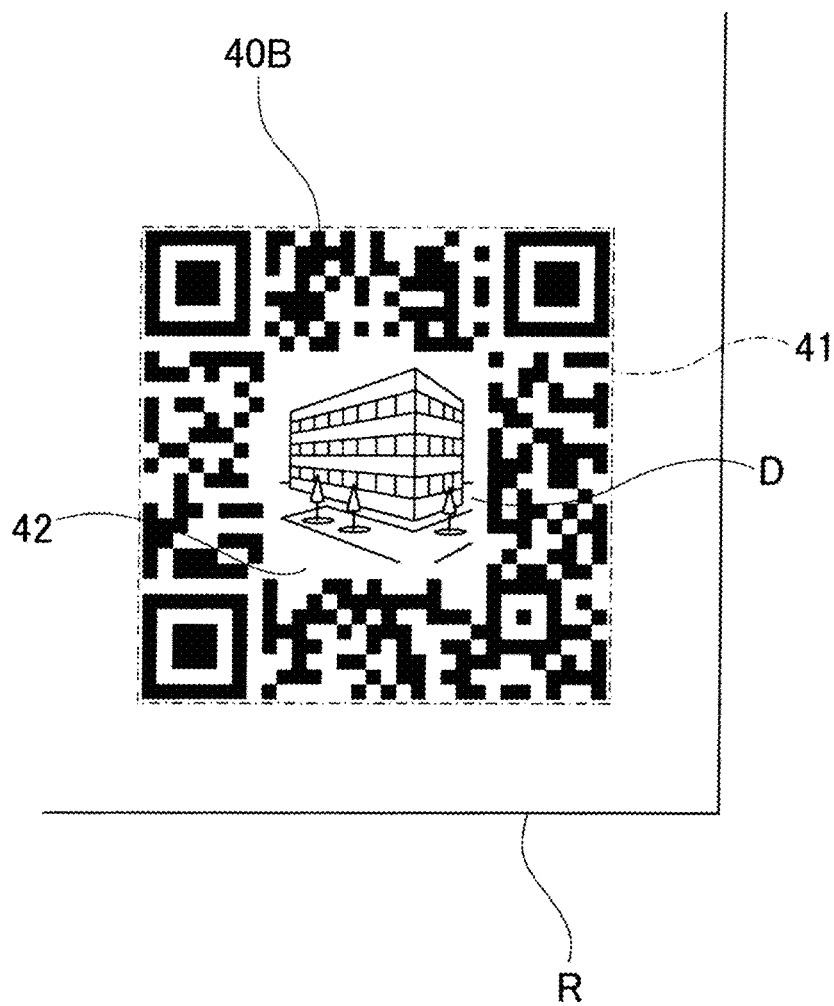
FIG. 14 is an explanatory diagram for describing an information code in which a predetermined image is arranged in a free region.

As a modification of the present embodiment, each terminal 20A may generate, as print data, data for printing a printing target stored in the storage unit 22 in a region corresponding to the free region 42 of the figure, in addition to the figure specified from the array pattern included in the received code print information, by storing information on the printing target in the storage unit 22 in advance in the free region 42. For example, as illustrated in FIG. 14, it is possible to print an information code 40B in which a predetermined image D is arranged in an empty area 42.

As a result, even when the information code 40B is printed so as to arrange a printing target such as a predetermined image D in the free region 42, it is not necessary to transmit the printing target data to the server 30A, so that the communication amount necessary for transmitting and receiving the printing target data can be reduced. In particular, since the data to be printed is not transmitted from the terminal 20A to the outside of the server 30A or the like, it is possible to enhance the security of the printing target.

Further, when instructing printing of the information codes 40A and 40B, each terminal 20A is not limited to instructing printing of the light-color cells as white and the dark-color cells as black, and may instruct printing by setting two types of cells to colors that can be distinguished according to their gray levels or differences in luminance.

The information code to be printed in the information code generation system 10A is not limited to being configured to be provided with the free region 42 as in the information code 40A illustrated in FIG. 10, and may be configured to be represented by a plurality of the light-color cells and the dark-color cells in a specific pattern region, a data recording region, and an error correction code recording region inside the code region, for example, by using another designated encoding technique.

In this configuration, since the code generation information transmitted from the server 30A to the terminal 20A is information related to the array pattern of the light-color cells and the dark-color cells, the amount of information can be reduced as in the case of binary information based on the unit region divided into the cell size. Therefore, compared with the case where the information code itself is transmitted from the server 30A to the terminal 20A, the amount of transmission is reduced, so that the load for the transmission process and other necessary processes can be further reduced.

Fourth Embodiment

Next, an information code generation system according to a fourth embodiment of the present invention will be described with reference to FIGS. 15 and 16.

The information code generation system 10A according to the fourth embodiment differs from the information code generation system according to the above-described first embodiment in that a plurality of information codes are printed on the same print medium R. Therefore, the same components as those of the information code generation system of the first embodiment are denoted by the same reference numerals, and description thereof is omitted.

Figure 15:
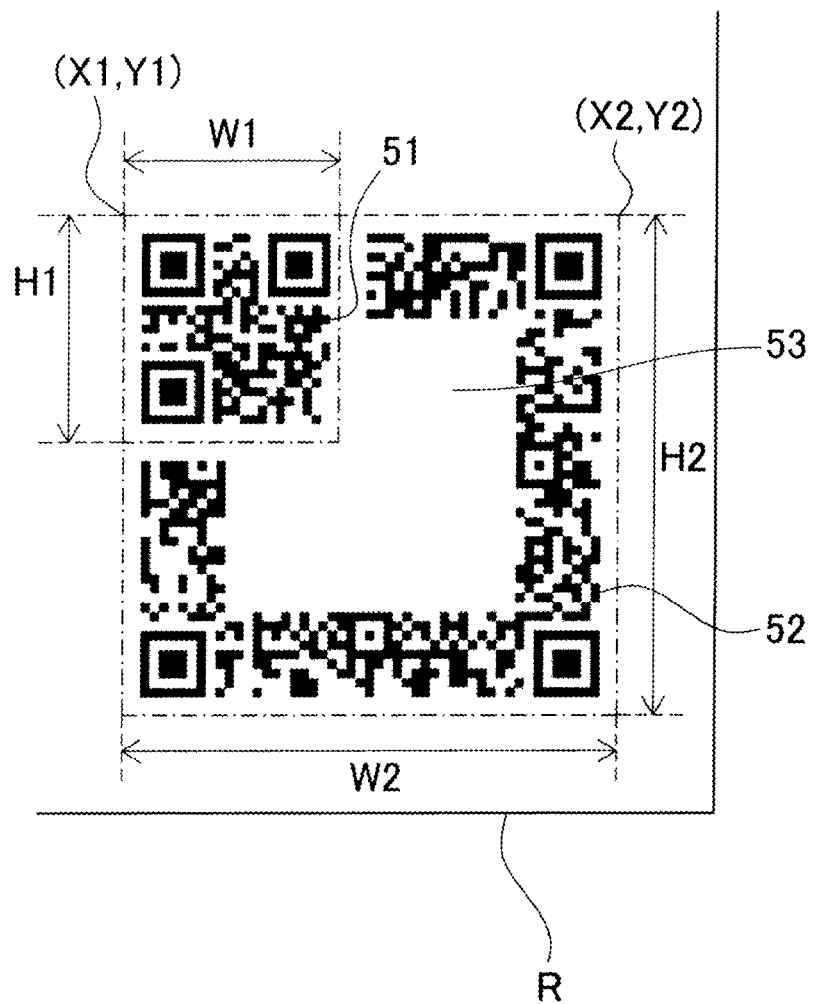
FIG. 15 is an explanatory diagram illustrating two information codes printed on a print medium in the second embodiment.

In the present embodiment, as illustrated in FIG. 15, two information codes (hereinafter, also referred to as a first information code 51 and a second information code 52) generated by using the information code generation system 10 so as to record different desired data are printed on the same print medium R in a predetermined positional relationship. Here, as the predetermined positional relationship, for example, a size including the margin of the first information code 51 (refer to the symbols W1 and H1 in FIG. 15) and a reference position (refer to the symbols X1 and Y1 in FIG. 15), a size including the margin of the second information code 52 (refer to the symbols W2 and H2 in FIG. 15), a reference position (refer to the symbols X2 and Y2 in FIG. 15), and the like are assumed.

Then, the server 30A obtains the array pattern without considering the positional relationship, the relative size, and the like of the first information code 51 and the second information code 52. In addition, the terminal 20A generates print data for printing such that the figure specified from the array pattern corresponding to the first information code 51 and the figure specified from the array pattern corresponding to the second information code 52 are in the predetermined positional relationship from the received code print information.

Hereinafter, in the present embodiment, processing when the first information code 51 and the second information code 52 generated by using the server 30A are printed by the printing apparatus 11 will be described with reference to the drawings. In the following description, a case where predetermined information including recorded data and additional information to be recorded in each information code is transmitted to the server 30A as a request from another external device different from the terminal 20A will be described in detail. Therefore, in the print instruction process performed by the terminal 20A, the process of transmitting the recorded data or the like of the step S101 described above is not necessary. In particular, let us assume that the additional information includes information on the positional relationship between the first information code 51 and the second information code 52, such as the predetermined positional relationship described above, and the relative sizes, colors, and the like.

When the request is received from another external device as described above (Yes in S201 of FIG. 12), the control unit 31 of the server 30A confirms the type and number of information codes generated for the received data, and the like (S203). Next, using the designated encoding technique, the array pattern setting process is performed for obtaining the array pattern of the light-color cells and the dark-color cells in the respective code regions when the first information code 51 and the second information code 52 are generated so that the received data is recorded. The information on the array patterns set by the array pattern setting process is set as code print information (S205), and the information is transmitted to the terminal 20A via the communication unit 33 with the additional information such as the positional relationship of the first information code 51 and the second information code 52 and the relative sizes, colors, etc. added thereto (S207).

In the terminal 20A, when the code print information or the like is received from the server 30A via the communication unit 25 (Yes in S103 of FIG. 11), the additional information added to the code print information is confirmed (S105). As a result, the positional relationship between the figure specified from the array pattern corresponding to the first information code 51 and the figure specified from the array pattern corresponding to the second information code 52, the relative size, color, and the like are obtained.

Next, print data for printing is generated in accordance with the additional information for which the figure specified from the array pattern included in the received code print information has been confirmed (S107). For example, a figure as exemplified in FIG. 16(A) is generated from the code print information corresponding to the first information code 51, and a figure as exemplified in FIG. 16(B) is generated from the code print information corresponding to the second information code 52, and the print data is generated so that both figures have the predetermined positional relationship. Then, the print data generated as described above is instructed to the printing apparatus 11 (S109). As a result, printing processing based on the instructed print data is performed by the printing apparatus 11, whereby the first information code 51 and the second information code 52 are printed on the print medium R, as illustrated in FIG. 15.

As described above, in the information code generation system 10 according to the present embodiment, a plurality of array patterns of the light-color cells and the dark-color cells in the code region when the first information code 51 and the second information code 52 are generated so that different data are recorded are obtained, and the code print information is set so as to include information on the plurality of array patterns. Then, in the terminal 20A, print data for printing figures specified from a plurality of array patterns included in the received code print information on the same print medium R is generated, and the print data is instructed to the printing apparatus 11.

Thus, even when the two information codes of the first information code 51 and the second information code 52 are respectively printed on the same print medium R, the load on the server 30A for generating the information code can be reduced. The same applies to the case where three or more information codes are printed on the same print medium R, and the load on the server 30A for generating the information codes can be reduced.

As a modification of the present embodiment, the terminal 20A is not limited to acquiring information on the predetermined positional relationship, color, and the like described above from another external device via the server 30A, and may acquire the information in response to an input operation by the input unit 23, reception from the outside, and the like. That is, in the terminal 20A, the print data is generated so that the figures respectively specified from a plurality of array patterns are printed on the same print medium R in a predetermined positional relationship, color, or the like. This eliminates the need for the server 30A to receive information on the positional relationship, color, etc. of each information code, and allows the terminal 20A to freely adjust the positional relationship, color, etc. of each generated information code, thereby enhancing the convenience of the user managing the terminal 20A.

Figure 17:
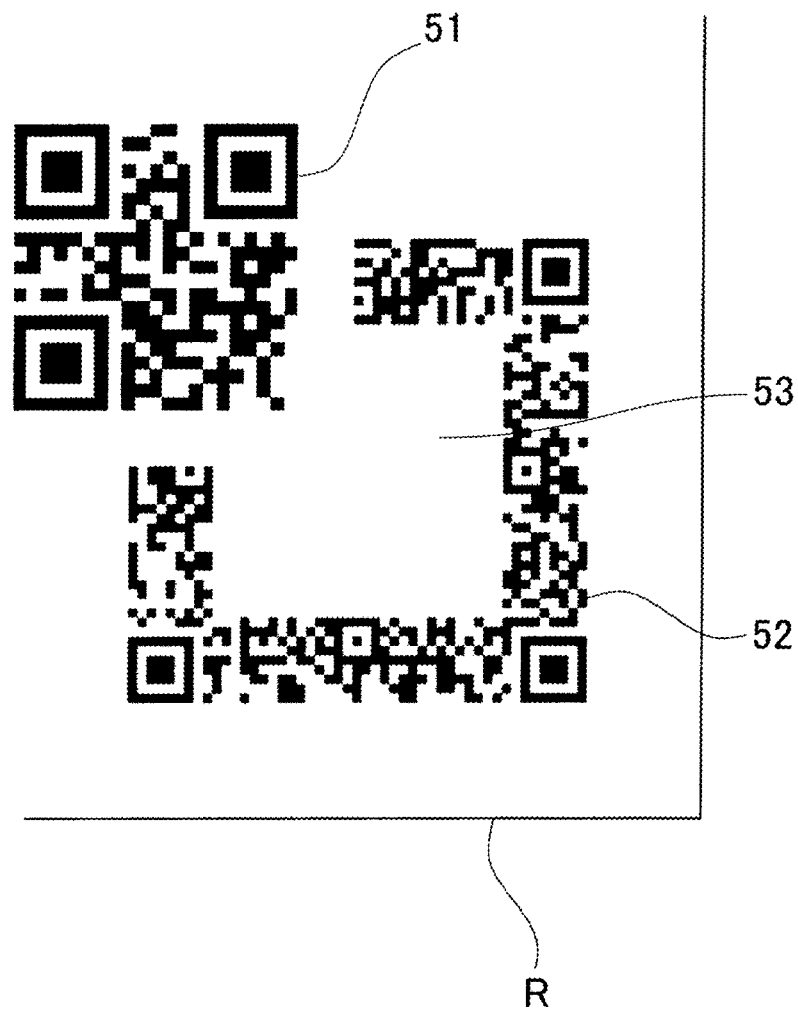
FIG. 17 is an explanatory diagram illustrating a printed state in which the positional relationship and the size of two information codes are changed with respect to FIG. 15.

Therefore, it is possible to generate the print data so that the cell size of the figure respectively specified from a plurality of array patterns is printed on the same print medium R in a predetermined positional relationship, differing from the cell size of the other figures. Thus, for example, as illustrated in FIG. 17, printing can be performed so that the cell size of the first information code 51 is larger than the cell size of the second information code 52. By changing the cell size in this manner, the first information code 51 having a relatively large cell size can be easily read by a general reader. In this case, for example, the second information code 52 having a relatively small cell size can be read by using a dedicated application that can be installed according to the reading result of the first information code 51 and can be read even with a smaller cell size.

Note that the predetermined information including the recorded data and the additional information to be recorded in each information code is not limited to being transmitted from another external device to the server 30A, and may be transmitted from the terminal 20A to the server 30A in the same manner as in the first embodiment.

Modifications

It should be noted that the present invention is not limited to the above-mentioned embodiments and variations, and may be embodied as follows, for example.

(1) In the information code generation system 10 according to the present invention, the generated information codes 40A, 40B, 51, and 52 are not limited to being used by being printed on the print medium R using the printing apparatus 11 that has received a print instruction from the terminal 20A (information terminal), but may be used by being displayed on the screen on the display unit 24 of the terminal 20A, for example.

(2) The request (predetermined information) received by the server 30A may include the type or the like of the information code to be generated. In this case, the server 30A can obtain the array pattern as described above by using the encoding technique corresponding to the specified type or the like.

(3) The terminal 20A is not limited to being configured as a stationary terminal arranged on a manufacturing line or the like on which the generated information code is printed, and may be configured as, for example, a portable terminal that can issue a print instruction to a printing apparatus arranged at a predetermined position.

PARTIAL REFERENCE SIGNS LIST

10 . . . Information code generation system
20 . . . Terminal
21 . . . Control unit (generation unit, instruction unit)
26 . . . Communication unit (Terminal-side communication unit, receiving unit)
30 . . . Server
31 . . . Control unit (setting unit)
33 . . . Communication unit (Server-side communication unit, transmission unit)
40, 40a . . . Information code
41 . . . Code region
42, 53 . . . Free region
51 . . . First information code
52 . . . Second information code
10A . . . Information code generation system
11 . . . Printing apparatus
20A . . . Information terminal (control apparatus)
30A . . . Server
40A, 40B . . . Information code

What is claimed is:

1. An information code generation system, comprising:
a terminal configured to execute a process using an information code generated by arranging in a code region a plurality of light-color cells and a plurality of dark-color cells; and
a server configured to communicate with the terminal;
wherein the terminal includes:
    a terminal-side communication unit configured to transmit predetermined information including data to be recorded in the information code to the server, and receives, code generation information from the server, in response to the transmission of the data from the terminal, the code generation information including digit information indicating which cell among the light-color and dark-color cells should be mapped to which cells dividing the code region; and
    a generation unit configured to generate the information code based on the code generation information received from the terminal-side communication unit such that the data to be recorded are expressed by the light-color and dark-color cells in the code region, and
wherein the server includes:
    a server-side communication unit configured to receive the predetermined information from the terminal, and in response to the reception, transmit the code generation information to the terminal; and
    a setting unit configured to operate such that, when the predetermined information has been received from the terminal, the setting unit i) sets an array of patterns composed of the light-color cells and the dark-color cells that should be arrayed in the code region to provide the data being recorded, and ii) sets the code generation information according to the array of patterns which has been set.

2. The information code generation system according to claim 1, wherein
the information code is provided with a free region formed in the code region, the free region being free from the array of the light-color cells and the dark-color cells that recoded the data;
the predetermined information further includes free region information related to the free region; and
the setting unit operates such that, when the predetermined information has been received from the terminal, the setting unit i) obtains the array of patterns composed of the light-color and dark-color cells arrayed in the code region, the array of patterns being provided when the information code is generated so that the data included in the predetermined information is recorded in the code region and the free region is arranged based on the free region information as well, and ii) sets, as the code generation information transmitted by the server-side communication unit, information about the array of patterns.

3. The information code generation system according to claim 2, wherein
the predetermined information includes data to be recorded in each of a plurality of information codes; and
the setting unit operates such that, when the predetermined information has been received from the terminal, the setting unit i) respectively obtains the array of patterns composed of the light-color and dark-color cells arrayed in the code region, the array of patterns being provided when the information code is generated so that the data included in the predetermined information is respectively recorded in the code region and the free region is arranged based on the free region information as well, and ii) sets, as the code generation information transmitted by the server-side communication unit, information about the array of patterns.

4. The information code generation system according to claim 1, wherein
the predetermined information includes data to be recorded in each of a plurality of information codes; and
the setting unit is configured to operate such that, when the predetermined information has been received from the terminal, the setting unit i) respectively obtains an array of patterns composed of the light-color and dark-color cells should be arrayed in the code region to provide the data being recorded, according to the array of patterns which has been set.

5. An information code generation system, comprising:
a printing apparatus configured to print an information code in which data is recorded by arranging in a code region a plurality of light-color cells and a plurality of dark-color cells;
a control apparatus configured to instruct the printing apparatus to print the information code; and
a server configured to communicate with the control apparatus,
the server includes:
a setting unit configured to i) set an array of patterns composed of the light-color cells and the dark-color cells to be arrayed in the code region in accordance with the data, and ii) set code print information according to the array of patterns which has been set, the code print information including digit information indicating which cell among the light-color cells and the dark-color cells should be printed as which of cells dividing the code region; and
a transmission unit configured to transmit to the control apparatus the code print information set by the setting unit,
the control apparatus includes:
a receiving unit configured to receive the code print information from the server;
a generation unit configured to generate print data for printing a figure specified from the array of patterns included in the code print information received from the receiving unit; and
an instruction unit configured to instruct the printing apparatus to print the print data generated by the generation unit;
wherein the printing apparatus prints the information code based on the print data instructed from the control apparatus.

6. The information code generation system according to claim 5, wherein
the information code is provided with a free region formed in the code region, the free region being free of the array of the light-color cells and the dark-color cells that recode the data; and
the setting unit is configured to obtain the array of patterns of the light-color cells and the dark-color cells in the code region when the information code is generated so that the data is recorded and the free region is provided, and the code print information can be set so as to include information on the array of patterns.

7. The information code generation system according to claim 6, wherein
the control apparatus includes a storage unit for storing information related to a printing target for printing in the free region, and
the generation unit is configured to generate, as the print data, data for printing the printing target stored in the storage unit in a region corresponding to the free region of the figure, in addition to the figure specified from the array of patterns included in the code print information, received from the receiving unit.

8. The information code generation system according to claim 7, wherein
the setting unit is configured to obtain a plurality of the arrays of patterns of the light-color cells and the dark-color cells in the code region when the information codes are respectively generated so that the content of each of information codes is different each other, the data is recorded in the information code, and the code print information is set so as to include information on the plurality of the array of patterns; and
the generation unit is configured to generate print data for respectively printing on the same print medium a figure specified from a plurality of the array of patterns included in the code print information received from the receiving unit.

9. The information code generation system according to claim 8, wherein the generation unit is configured to generate the print data so that each figure respectively specified from a plurality of the arrays of patterns is printed on the print medium having the same predetermined positional relation.

10. The information code generation system according to claim 9, wherein the generation unit is configured to generate the print data so that a cell size of each figure respectively specified from a plurality of the array of patterns is printed on the same print medium having a different cell size as that of the other figures.

11. The information code generation system according to claim 6, wherein the setting unit obtains a plurality of array of patterns of the light-color cells and the dark-color cells in the code region when the information codes are respectively generated so that content of each of information codes is different from each other, the data is recorded in each of the information codes, and the code print information is set so as to include information on the plurality of the array of patterns; and the generation unit generates print data for respectively printing on the same print medium a figure specified from a plurality of the array of patterns included in the code print information received from the receiving unit.

12. The information code generation system according to claim 11, wherein the generation unit generates the print data so that each figure respectively specified from a plurality of the array of patterns is printed on the print medium having the same predetermined positional relation.

13. The information code generation system according to claim 12, wherein the generation unit generates the print data so that a cell size of each figure respectively specified from a plurality of the array of patterns is printed on the same print medium having a different cell size as that of the other figures.

14. The information code generation system according to claim 5, wherein:

the setting unit obtains a plurality of array of patterns of the light-color cells and the dark-color cells in the code region when the information codes are respectively generated so that content of each of information code different each other, the data is recorded in each of the information codes, and the code print information is set so as to include information on the plurality of the array of patterns; and the generation unit generates print data for respectively printing on the same print medium a figure specified from a plurality of the array of patterns included in the code print information received from the receiving unit.

15. The information code generation system according to claim 14, wherein the generation unit generates the print data so that each figure respectively specified from a plurality of the array of patterns is printed on the print medium having the same predetermined positional relation.

16. The information code generation system according to claim 15, wherein the generation unit generates the print data so that a cell size of each figure respectively specified from a plurality of the array of patterns is printed on the same print medium having a different cell size as that of the other figures.

17. An information code generation method performed between a terminal that executes a process using an information code generated by arranging in a code region a plurality of light-color cells and a plurality of dark-color cells in a code region of the information code; and a server that is communicable with the terminal, wherein the information code generation method includes:

first transmitting from the terminal to the server predetermined information including data to be recorded in an information code to the server;

first receiving the predetermined information by the server;

first setting, in the server, an array of patterns composed of the light-color cells and the dark-color cells which should be arrayed in the code region to provide the data being recorded;

second setting, in the server, code generation information according to the array of patterns which has been set, the code generation information including digit information indicating which cell among the light-color and dark color cells should be mapped to which cells dividing the code region;

second transmitting from the server to the terminal the code generation information which has been set;

second receiving from the server the code generation information; and generating, in the terminal, the information code based on the received code generation information such that the data to be recorded is expressed by the light-color and dark-color cells in the code region.

18. An information processing method performed among:

a printing apparatus for printing an information code in which data is recorded by arranging in a code region thereof a plurality of light-color cells and a plurality of dark-color cells;

a control apparatus that instructs the printing apparatus to print the information code; and a server that is communicable with the control apparatus, wherein the information processing method includes:

i) setting in the server an array of patterns composed of the light-color cells and the dark-color cells to be arrayed in the code region in accordance with the data, and ii) setting code print information according to the array of patterns which has been set, the code print information including digit information indicating which cell among the light and dark color cells should be printed as which of cells dividing the code region;

transmitting the code print information from the server to the control apparatus, receiving, by the control apparatus, the code print information from the server;

generating, by the control apparatus, print data for printing a figure specified from the array of patterns included in the received code print information; and instructing the printing apparatus to print the generated print data such that the printing apparatus prints the information code based on the print data instructed from the control apparatus.

\* \* \* \* \*